United States Patent
Johnston et al.

(10) Patent No.: US 7,505,908 B2
(45) Date of Patent: Mar. 17, 2009

(54) SYSTEMS AND METHODS FOR CLASSIFYING AND REPRESENTING GESTURAL INPUTS

(75) Inventors: Michael J. Johnston, Hoboken, NJ (US); Srinivas Bangalore, Morristown, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 760 days.

(21) Appl. No.: 10/216,390

(22) Filed: Aug. 12, 2002

(65) Prior Publication Data

US 2003/0046087 A1 Mar. 6, 2003

Related U.S. Application Data

(60) Provisional application No. 60/313,121, filed on Aug. 17, 2001.

(51) Int. Cl.
*G10L 21/00* (2006.01)
(52) U.S. Cl. ............... 704/275; 704/270; 704/270.1; 704/3
(58) Field of Classification Search ............. 704/275, 704/270, 3, 270.1
See application file for complete search history.

(56) References Cited

U.S. PATENT DOCUMENTS

| | | | |
|---|---|---|---|
| 5,600,765 A * | 2/1997 | Ando et al. ................. 345/668 |
| 5,748,974 A | 5/1998 | Johnson | |
| 5,781,179 A | 7/1998 | Nakajima et al. | |
| 5,884,249 A | 3/1999 | Namba et al. | |
| 6,073,098 A | 6/2000 | Buchsbaum et al. | |
| 6,233,544 B1 | 5/2001 | Alshawi | |
| 6,324,512 B1 | 11/2001 | Junqua et al. | |
| 6,345,111 B1 * | 2/2002 | Yamaguchi et al. ......... 382/118 |
| 6,401,065 B1 | 6/2002 | Kanevsky et al. | |
| 6,674,426 B1 * | 1/2004 | McGee et al. ............... 345/173 |
| 6,779,060 B1 * | 8/2004 | Azvine et al. ................. 710/65 |
| 6,807,529 B2 | 10/2004 | Johnson et al. | |
| 6,823,308 B2 | 11/2004 | Keiller et al. | |
| 6,868,383 B1 | 3/2005 | Bangalore et al. | |
| 6,964,023 B2 * | 11/2005 | Maes et al. ................. 715/811 |
| 7,036,128 B1 * | 4/2006 | Julia et al. ................. 719/317 |
| 7,107,205 B2 | 9/2006 | Kempe | |

(Continued)

FOREIGN PATENT DOCUMENTS

EP 0 243 009 10/1987

(Continued)

OTHER PUBLICATIONS

Co-pending U.S. Appl. No. 10/278,921 to Johnston et al., filed Oct. 24, 2002, entitled "Systems and Methods for Generating Markup-Language Based Expressions for Multi-Modal and Unimodal Inputs."

(Continued)

*Primary Examiner*—Qi Han

(57) ABSTRACT

Gesture and handwriting recognition agents provide possible interpretations of electronic ink. Recognition is performed on both individual strokes and combinations of strokes in the input ink lattice. The interpretations of electronic ink are classified and encoded as symbol complexes where symbols convey specific attributes of the contents of the stroke. The use of symbol complexes to represent strokes in the input ink lattice facilitates reference to sets of entities of a specific type.

36 Claims, 24 Drawing Sheets

U.S. PATENT DOCUMENTS

| | | | |
|---|---|---|---|
| 2003/0046087 | A1 | 3/2003 | Johnston et al. |
| 2003/0055644 | A1 | 3/2003 | Johnston et al. |
| 2003/0065505 | A1 | 4/2003 | Johnston et al. |
| 2003/0093418 | A1 | 5/2003 | Bangalore et al. |

FOREIGN PATENT DOCUMENTS

| | | |
|---|---|---|
| GB | 2 209 418 | 5/1989 |

OTHER PUBLICATIONS

Co-pending U.S. Appl. No. 10/216,392 to Johnston et al., filed Aug. 12, 2002, entitled "Systems and Methods for Abstracting Portions of Information that is Represented with Finite-State Devices."

Co-pending U.S. Appl. No. 10/216,448 to Johnston et al., filed Aug. 12, 2002, entitled "Systems and Methods for Aggregating Related Inputs Using Finite-State Devices and Extracting Meaning from Multimodal Inputs Using Aggregation."

Mehryar Mohri, "Finite-State Transducers in Language and Speech Processing", 1997 Association for Computational Linguistics, vol. 23, No. 2, pp. 1-42.

Michael Johnston et al., "Finite-state Multimodal Parsing and Understanding", *In Proceedings of COLING 2000*, Saarbruecken, Germany.

Michael Johnston , "Unification-based Multimodal Parsing", *In Proceedings of COLING-ACL*, 1998, pp. 624-630, Montreal, Canada.

Michael Johnston et al., "Unification-based Multimodal Integration", *Proceedings of the 35th ACL*, Madrid, Spain, 1997, pp. 281-288.

Fernando C. N. Pereira et al., "Finite-State Approximation of Phrase Structure Grammars", in E. Roche and Schabes Y., editors, *Finite State Devices for Natural Language Processing*. MIT Press, Cambridge, Massachusetts pp. 246-255.

M. Johnston,"Deixis and Conjunction in Multimodal Systems", *Proceedings of COLING 2000*, Saarbruecken, Germany, 2000.

Lizhong Wu, et al: "Statistical multimodal integration for intelligent HCI" Neural Networks for Signal Processing IX, 1999. Proceedings of the 1999 IEEE Signal Processing Society Workshop. Madison, WI, USA Aug. 23-25, 1999, Piscataway, NJ, USA, IEEE, US, Aug. 23, 1999, pp. 487-496, XP010348491 ISBN: 0-7803-5673-X * p. 489, line 27-p. 490, line 27.

M. Mohri, et al :"Weighted Automata in Text and Speech Processing" Extended Finite State Models of Languages: Proceedings of the ECAI 96 Workshop, [Online] 1996, XP002377632 Retrieved from the Internet:URL:http://citeseer.ist.psu.edu/mohri96weighted.html>[retrieved on Apr. 20, 2006] p. 1, paragraph 2-p. 2,p. 3, paragraph 4-p. 4.

Johnston et al (MATCH: Multimodal Access to City Help, retrieved from http://www.Research.att.com/johnston/johnstonetalasru01.pdf on Feb. 17, 2006, published on Oct. 4, 2001, 4 pages.

Wu et al., "Statistical multimodal integration for intelligent HCI", Neural Networks for Signal Processing IX, 1999. Proceedings of the 1999 IEEE Signal Processing Society Workshop, Madison, WI, USA Aug. 23-25, 1999, Piscataway, NJ, USA, IEEE, US, Aug. 23, 1999, pp. 487-496, XP010348491 ISBN: 0-7803-5673-X * p. 489, line 27-p. 490, line 27.

Johnston et al., "Finite-state Methods for Multimodal Parsing and Integration" in ESSLLI Workshop on Finite-State Methods, Helsinki, Finland, Aug. 2001, pp. 1-6.

Mohri, "Finite-state Transducers in Language and Speech Processing", 1997 Association for Computational Linguistics, vol. 23, No. 2, pp. 1-42.

Johnston, "Multimodal Language Processing", Proceedings of ICSLP 1998 (published on CD-ROM only).

Johnston, "Unification-based Multimodal Parsing", In Proceedings of COLING-ACL, 1998, pp. 624-630.

Johnston, "Unification-based Multimodal Integration", Proceedings of the 35th ACL, Madrid, Spain, 1997, pp. 281-288.

Pereria et al., "Finite-State Approximation of Phrase Structure Grammars", in E. Roche and Schabes Y., editors, Finite State Devices for Natural Language Processing. MIT Press, Cambridge, Massachusetts, pp. 246-255.

* cited by examiner

FIG. 6

```
S            →    COMMAND
COMMAND      →    Show:eps:<show> NP eps:eps:/show>
COMMAND      →    tell:eps:<info> me:eps:eps about:eps:eps
                  DEICTICNP eps:eps:</info>
NP           →    eps:eps:<restaurant> CUISMOD
                  restaurants:eps:eps LOCMOD
                  eps:eps:</restaurant>
DEICTICNP    →    DDETSG SELECTION
                  eps:1:eps RESTSG eps:eps:<restaurant>
                  Entry eps:eps</restaurant>
DEICTICNP    →    DDETPL SELECTION
             →    NUM RESTPL eps:eps:<restaurant>
             →    Entry eps:eps</restaurant>
SELECTION    →    eps:area:eps eps:selection:eps
CUISMOD      →    eps:eps:<cuisine>
                  CUISINE eps:eps:</cuisine>
CUISINE      →    italian:eps:italian
CUISINE      →    chinese:eps:chinese
LOCMOD       →    eps:eps:<location>
                  LOCATION eps:eps:</location>
LOCMOD       →    eps:eps:eps
LOCATION     →    in:eps:eps this:G:eps
                  area:area:eps eps:location:eps Entry
LOCATION     →    along:eps:eps this:G:eps
                  route:line:eps eps:location:eps Entry
DDETSG       →    this:G:eps
DDETPL       →    these:G:eps
NUM          →    two:2:eps
NUM          →    three:3:eps
RESTSG       →    restaurant:restaurant:eps
RESTPL       →    restaurants:restaurant:eps
Entry        →    eps:SEM:SEM
```

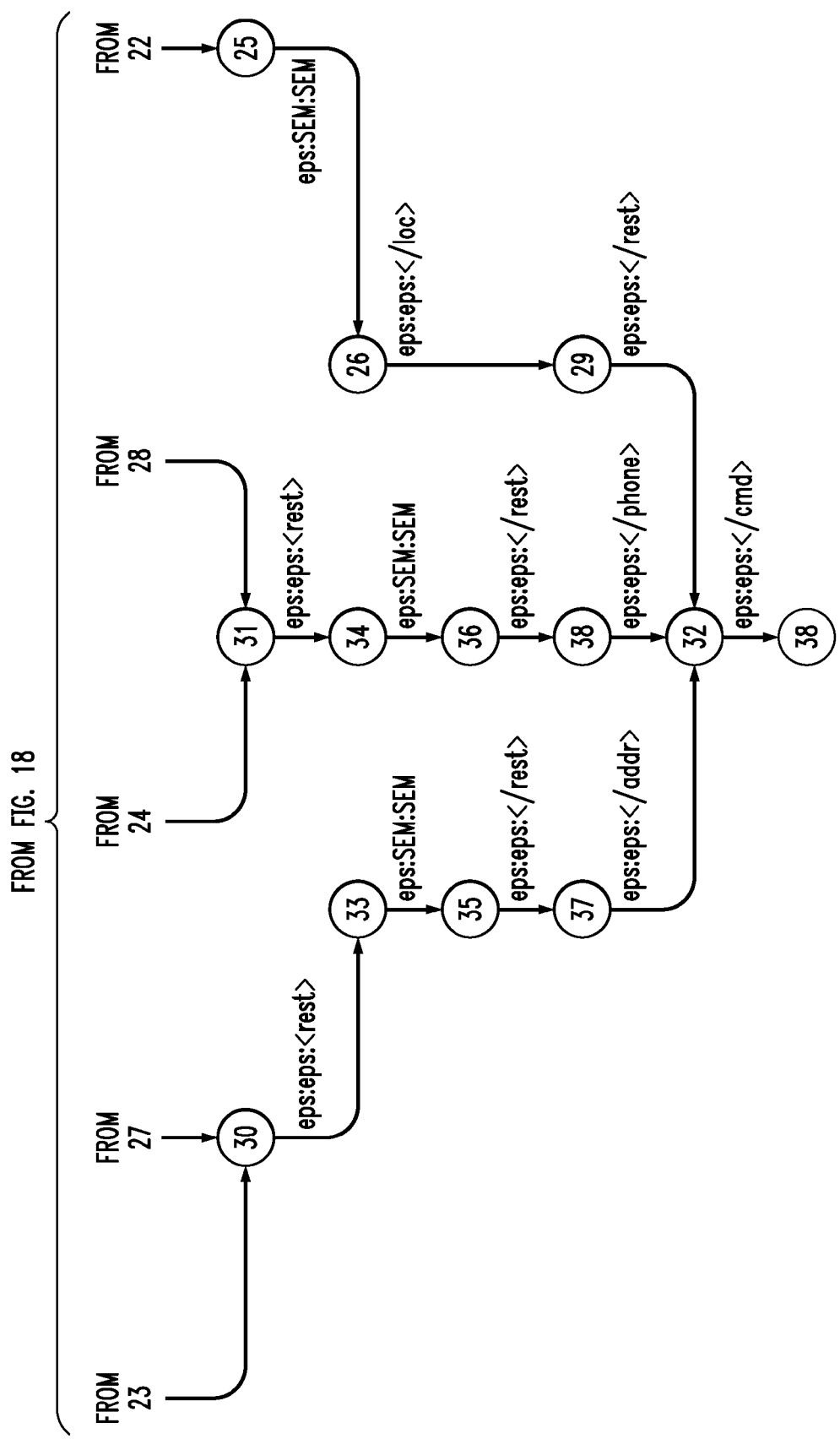
FIG. 18cont.

FIG. 19

S eps:eps:<cmd> _CMD eps:eps:</cmd>

_CMD _PHONECMD
_CMD _ADDRESSCMD
_CMD _SHOWRESTAURANTCMD

_PHONECMD phone:eps:<phone> for:eps:eps _DEICTICNP eps:eps:</phone>
_ADDRESSCMD address:eps:<addr> for eps:eps DEICTICNP eps:eps:</addr>

_SHOWRESTAURANTCMD show:eps:eps:<show><rest> _CUISINE restaurants:eps:eps
    _AREALLOCATION eps:eps:</rest>

_DEICTICNP _DDETSG eps:area:eps: eps:sel:eps: eps:1:eps _RESTSG
        eps:eps:<rest> eps:SEM:SEM eps:eps:</rest>
_DEICTICNP _DDETPL eps:area:eps eps:sel:eps _NUM _RESTPL
        eps:eps:<rest> eps:SEM:SEM eps:eps:</rest>
_DEICTICNP _DDETSG eps:area:eps eps:sel:eps eps:1:eps _RESTSG
        eps:eps:<rest> eps:SEM:SEM eps:eps:</rest> and:eps:eps _DEICTICNP
DEICTICNP _DDETPL eps:area:eps eps:sel:eps _NUM _RESTPL
        eps:eps:<rest> eps:SEM:SEM eps:eps:</rest> and:eps:eps _DEICTICNP _DDETPL these:G:eps
_DDETPL those:G:eps
_DDETPL this:G:eps
_DDETPL that:G:eps _AREALOCATION here:G:eps eps:area:eps eps:loc:<loc>
        eps:SEM:SEM eps:eps:</loc>

_RESTPL restaurants:restaurant:eps
_RESTSG restaurant:restaurant:eps

_NUM three:3:eps
_NUM two:2:eps
_NUM four:4:eps

_CUISINE chinese:eps:<cuis>chinese</cuis>
_CUISINE italian:eps:<cuis>italian</cuis>

<cmd><<phone><rest>[id1]</rest><rest>[id2,id3]</rest></phone></cmd>

SYSTEMS AND METHODS FOR CLASSIFYING AND REPRESENTING GESTURAL INPUTS

This non-provisional application claims the benefit of U.S. provisional application No. 60/313,121, filed on Aug. 17, 2001, which is incorporated herein by reference in its entirety.

BACKGROUND OF THE INVENTION

1. Field of Invention

This invention is directed to classifying and representing gestural inputs.

2. Description of Related Art

Multimodal interfaces allow input and/or output to be conveyed over multiple different channels, such as speech, graphics, gesture and the like. Multimodal interfaces enable more natural and effective interaction, because particular modes are best-suited for particular kinds of content. Multimodal interfaces are likely to play a critical role in the ongoing migration of interaction from desktop computing to wireless portable computing devices, such as personal digital assistants, like the Palm Pilot®, digital cellular telephones, public information kiosks that are wirelessly connected to the Internet or other distributed networks, and the like. One barrier to adopting such wireless portable computing devices is that they offer limited screen real estate, and often have limited keyboard interfaces, if any keyboard interface at all.

To realize the full potential of such wireless portable computing devices, multimodal interfaces need to support not just input from multiple modes. Rather, multimodal interfaces also need to support synergistic multimodal utterances that are optimally distributed over the various available modes. In order to achieve this, the content from different modes needs to be effectively integrated.

One previous attempt at integrating the content from the different modes is disclosed in "Unification-Based Multimodal Integration", M. Johnston et al., *Proceedings of the 35th ACL*, Madrid Spain, p. 281-288, 1997 (Johnston 1), incorporated herein by reference in its entirety. Johnston 1 disclosed a pen-based device that allows a variety of gesture utterances to be input through a gesture mode, while a variety of speech utterances can be input through a speech mode.

In Johnston 1, a unification operation over typed feature structures was used to model the integration between the gesture mode and the speech mode. Unification operations determine the consistency of two pieces of partial information. If the two pieces of partial information are determined to be consistent, the unification operation combines the two pieces of partial information into a single result. Unification operations were used to determine whether a given piece of gestural input received over the gesture mode was compatible with a given piece of spoken input received over the speech mode. If the gestural input was determined to be compatible with the spoken input, the two inputs were combined into a single result that could be further interpreted.

In Johnston 1, typed feature structures were used as a common meaning representation for both the gestural inputs and the spoken inputs. In Johnston 1, the multimodal integration was modeled as a cross-product unification of feature structures assigned to the speech and gestural inputs. While the technique disclosed in Johnston 1 overcomes many of the limitations of earlier multimodal systems, this technique does not scale well to support multi-gesture utterances, complex unimodal gestures, or other modes and combinations of modes. To address these limitations, the unification-based multimodal integration technique disclosed in Johnston 1 was extended in "Unification-Based Multimodal Parsing", M. Johnston, *Proceedings of COLING-ACL* 98, p. 624-630, 1998 (Johnston 2), herein incorporated by reference in its entirety. The multimodal integration technique disclosed in Johnston 2 uses a multi-dimensional chart parser. In Johnston 2, elements of the multimodal input are treated as terminal edges by the parser. The multimodal input elements are combined together in accordance with a unification-based multimodal grammar. The unification-based multimodal parsing technique disclosed in Johnston 2 was further extended in "Multimodal Language Processing", M. Johnston, *Proceedings of ICSLP* 1998, 1998 (published on CD-ROM only) (Johnston 3), incorporated herein by reference in its entirety.

Johnston 2 and 3 disclosed how techniques from natural language processing can be adapted to support parsing and interpretation of utterances distributed over multiple modes. In the approach disclosed by Johnston 2 and 3, speech and gesture recognition produce n-best lists of recognition results. The n-best recognition results are assigned typed feature structure representations by speech interpretation and gesture interpretation components. The n-best lists of feature structures from the spoken inputs and the gestural inputs are passed to a multi-dimensional chart parser that uses a multi-modal unification-based grammar to combine the representations assigned to the input elements. Possible multimodal interpretations are then ranked. The optimal interpretation is then passed on for execution.

Further, in Johnston 1-3, gestural inputs are assigned typed feature structures by the gesture representation agents. Using feature structures as a semantic representation framework allow for the specification of partial meanings. Spoken or gestural input which partially specify a command can be represented as an underspecified feature structure in which certain features are not instantiated. Adopting typed feature structures facilitates the statement of constraints on integration. For example, if a given speech input can be integrated with a line gesture, it can be assigned a feature structure with an underspecified location feature whose value is required to be of type line.

SUMMARY OF THE INVENTION

However, the unification-based approach disclosed in Johnston 1-Johnston 3 does not allow for tight coupling of multimodal parsing with speech and gesture recognition. Compensation effects are dependent on the correct answer appearing in each of the n-best list of interpretations obtained from the recognitions obtained from the inputs of each mode. Moreover, multimodal parsing cannot directly influence the progress of either speech recognition or gesture recognition. The multi-dimensional parsing approach is also subject to significant concerns in terms of computational complexity. In the worst case, for the multi-dimensional parsing technique disclosed in Johnston 2, the number of parses to be considered is exponential relative to the number of input elements and the number of interpretations the input elements have. This complexity is manageable when the inputs yield only n-best results for small n. However, the complexity quickly gets out of hand if the inputs are sizable lattices with associated probabilities.

The unification-based approach also runs into significant problems when choosing between multiple competing parses and interpretations. Probabilities associated with composing speech events and multiple gestures need to be combined. Uni-modal interpretations need to be compared to multimodal interpretations and so on. While this can all be achieved using the unification-based approach disclosed in Johnston 1-Johnston 3, significant post-processing of sets of competing multimodal interpretations generated by the multimodal parser will be involved.

An alternative to the unification-based multimodal parsing technique disclosed in Johnston 3 is discussed in "Finite-state Multimodal Parsing and Understanding", M. Johnston and S. Bangalore, *Proceedings of COLING* 2000, Saarbrucken, Germany, 2000 (Johnston 4) and in U.S. patent application Ser. No. 09/904,253, each incorporated herein by reference in its entirety. In Johnston 4, multimodal parsing, understanding and/or integration are achieved using a weighted finite-state device which takes speech and gesture streams as inputs and outputs their joint interpretation. This finite state approach is significantly more efficient, enables tight-coupling of multimodal understanding with speech recognition, and provides a general probabilistic framework for multimodal ambiguity resolution.

In Johnston 4 and the incorporated 253 application, language and gesture input streams are parsed and integrated by a single weighted finite-state device. This single weighted finite-state device provides language models for speech and gesture recognition and composes the meaning content from the speech and gesture input streams into a single semantic representation. Thus, Johnston 4 and the incorporated 253 application not only address multimodal language recognition, but also encode the semantics as well as the syntax into a single weighted finite-state device. Compared to the previous approaches for integrating multimodal input streams, such as those described in Johnston 1-3, which compose elements from n-best lists of recognition results, Johnston 4 and the incorporated 253 application provide the potential for direct compensation among the various multimodal input modes.

Further, in Johnston 4 and the incorporated 253 application, the structure interpretation of the multimodal commands is captured in a multimodal context-free grammar in which the multimodal aspects of the context free grammar are apparent in the terminals. The terminals contain three components, W, G and M, where W is the spoken language stream, G is the gesture stream, and M is the combined meaning. The nonterminals in the multimodal grammar are atomic symbols. In some exemplary embodiments of Johnston 4 and the incorporated 253 application, the gesture symbols G can be organized into a type hierarchy reflecting the ontology of the entities in the application domain. For example, a pointing gesture may be assigned the general semantic type "G". This general semantic gesture "G" may have various subtypes, such as "Go" and "Gp". In various exemplary embodiments, "Go" represents a gesture made against an organization object. In various exemplary embodiments, "Gp" represents a gesture made against a person object. Furthermore, the "Gp" type gesture may itself have subtypes, such as, for example, "Gpm" and "Gpf" for objects that respectively represent male and female persons. Compared with a feature-based multimodal grammar, these semantic types constitute a set of atomic categories which make the relevant distinctions for gesture events to predict speech events and vice versa.

Johnston 4 and the incorporated 253 application allow the gestural input to dynamically alter the language model used for speech recognition. In addition, the approach provided in Johnston 4 and the incorporated 253 application reduce the computational complexity of multi-dimensional multimodal parsing. In particular, the weighted finite-state devices, used in Johnston 4 and the incorporated 253 application, provide a well-understood probabilistic framework for combining the probability distributions associated with the speech and gesture or other input modes and for selecting among multiple competing multimodal interpretations.

Systems and methods for recognizing and representing gestural input have been very limited. Both the feature-based multimodal grammar provided in Johnston 1-3 and the multimodal context free grammar disclosed in Johnston 4 and the incorporated 253 application may be used to capture the structure and interpretation of multimodal commands. However, neither approach allows for efficiently and generically representing arbitrary gestures.

This invention provides systems and methods for interpreting individual gestures and/or combinations of gestures.

This invention separately provides systems and methods for interpreting individual gestures and/or handwriting strokes and/or combinations of gestures and/or handwriting strokes.

This invention separately provides systems and methods for encoding gestures as symbol complexes.

This invention separately provides systems and methods for classifying gestures as symbol complexes.

This invention separately provides systems and methods for encoding gestures as symbol complexes and for implementing the encoded gestures as a directed and labeled graph.

This invention separately provides systems and methods for classifying gestures as symbol complexes and for implementing the classified gestures as a directed and labeled graph.

This invention separately provides systems and methods for encoding gestures as symbol complexes which are implemented as a directed and labeled graph which can then be used to modify a language model used by an automatic speech recognition system.

This invention separately provides systems and methods for encoding and representing recognized information in an informational input, encoding information into at least one classification scheme comprising a sequence of symbols, wherein each symbol identifies an attribute of the informational and outputting the classification scheme.

This invention separately provides systems and methods for encoding and representing recognized gestures made by a user, encoding the recognized gesture into at least one recognition result comprising a sequence of symbols, wherein each symbol identifies an attribute of the recognized gesture and outputting the recognition result.

This invention separately provides systems and methods for recognizing and encoding strokes made on an electronic ink lattice, wherein a recognition device recognizes gestures and an encoding device encodes the recognized gesture into at least one recognition result comprising a sequence of symbols, wherein each symbol identifies an attribute of the recognized gesture.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein:

FIG. 6 is one exemplary embodiment of a three-tape multimodal grammar fragment usable by the multimodal meaning recognition system according to this invention;

FIG. 19 is one exemplary embodiment of a multimodal grammar fragment usable by the multimodal recognition system according to this invention;

DETAILED DESCRIPTION OF EXEMPLARY EMBODIMENTS

Figure 1:
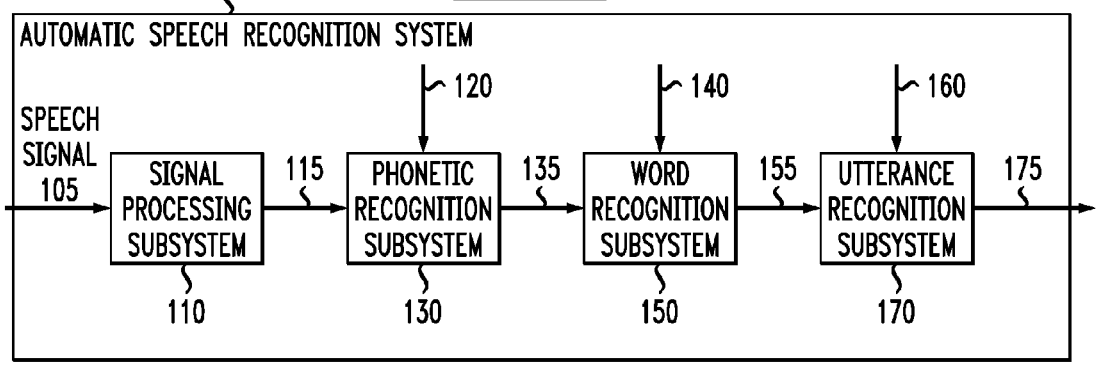
FIG. 1 is a block diagram illustrating one exemplary embodiment of a conventional automatic speech recognition system usable with a multimodal meaning recognition system according to this invention.
Figure 2:
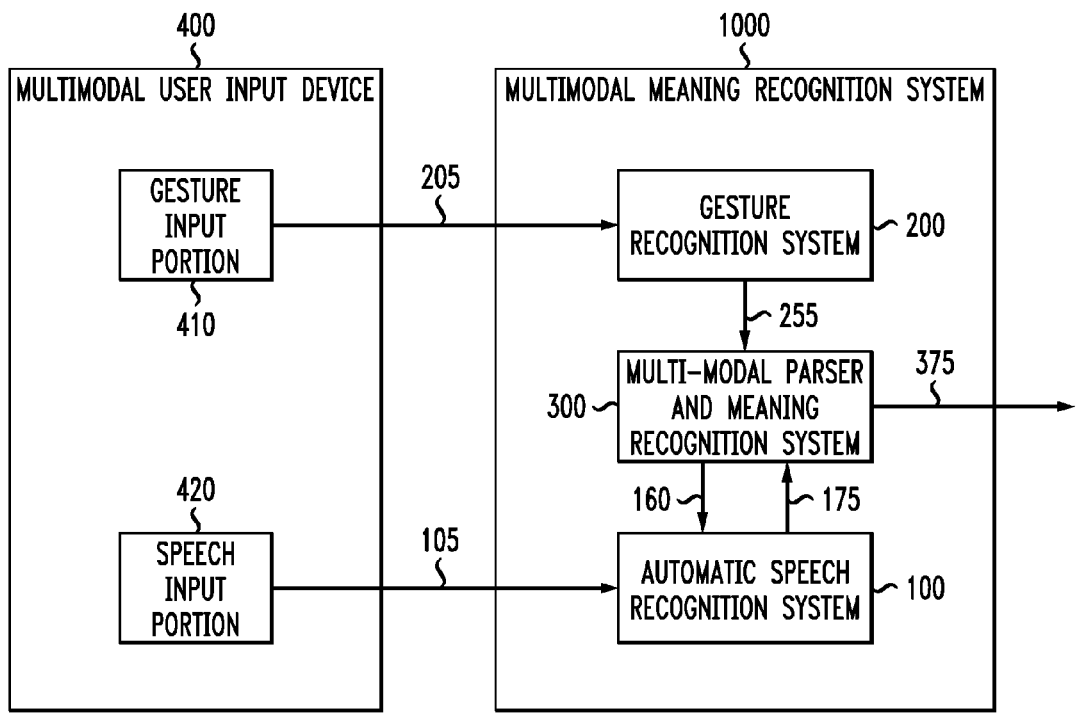
FIG. 2 is a block diagram illustrating a first exemplary embodiment of a multimodal user input device and one exemplary embodiment of a multimodal meaning recognition system according to this invention.

FIG. 1 illustrates one exemplary embodiment of an automatic speech recognition system 100 usable with the multimodal recognition and/or meaning system 1000 according to this invention that is shown in FIG. 2. As shown in FIG. 1, automatic speech recognition can be viewed as a processing pipeline or cascade.

In each step of the processing cascade, one or two lattices are input and composed to produce an output lattice. In automatic speech recognition and in the following description of the exemplary embodiments of the systems and methods of this invention, the term "lattice" denotes a directed and labeled graph, which is possibly weighted. In each lattice, there is typically a designated start node "s" and a designated final node "t". Each possible pathway through the lattice from the start node s to the final node t induces a hypothesis based on the arc labels between each pair of nodes in the path. For example, in a word lattice, the arc labels are words and the various paths between the start node s and the final node t form sentences. The weights on the arcs on each path between the start node s and the final node t are combined to represent the likelihood that that path will represent a particular portion of the utterance.

As shown in FIG. 1, one exemplary embodiment of a known automatic speech recognition system 100 includes a signal processing subsystem 110, an acoustic model lattice 120, a phonetic recognition subsystem 130, a lexicon lattice 140, a word recognition subsystem 150, a grammar or language model lattice 160, and a task recognition subsystem 170. In operation, uttered speech is input via a microphone, which converts the sound waves of the uttered speech into an electronic speech signal. The electronic speech signal is input to the signal processing subsystem 110 on a speech signal input line 105. The signal processing subsystem 110 digitizes the electronic speech signal to generate a feature vector lattice 115. The feature vector lattice 115 is a lattice of acoustic feature vectors. The feature vector lattice 115 is input along with the acoustic model lattice 120 to the phonetic recognition subsystem 130. The acoustic model lattice 120 represents a set of acoustic models and is applied to transform the feature vector lattice 115 into a phone lattice. Each node of the phone lattice represents a spoken sound, such as, for example, the vowel /e/ in "bed".

The phone lattice 135 is input along with the lexicon lattice 140 into the word recognition subsystem 150. The lexicon lattice 140 describes different pronunciations of various words and transforms the phone lattice 135 into a word lattice 155. The word lattice 155 is then input, along with the grammar or language model lattice 160, into the utterance recognition subsystem 170. The grammar or language model lattice 160 represents task-specific information and is used to extract the most likely sequence of uttered words from the word lattice 155. Thus, the utterance recognition subsystem 170 uses the grammar or language model lattice 160 to extract the most likely sentence or other type of utterance from the word lattice 155. In general, the grammar or language model lattice 160 will be selected based on the task associated with the uttered speech. The most likely sequence of words, or the lattice of n most-likely sequences of words, is output as the recognized utterance 175.

In particular, one conventional method of implementing automatic speech recognition forms each of the acoustic model lattice 120, the lexicon lattice 140 and the grammar or language model lattice 160 as a finite-state transducer. Thus, each of the phonetic recognition subsystem 130, the word recognition subsystem 150, and the utterance recognition 170 performs a generalized composition operation between its input finite-state transducers. In addition, the signal processing subsystem 110 outputs the features vector lattice 115 as a finite-state transducer.

Conventionally, the grammar or language model lattice 160 is predetermined and incorporated into the automatic speech recognition system 100 based on the particular recognition task that the automatic speech recognition system 100 is to perform. In various exemplary embodiments, any of the acoustic model lattice 120, the lexicon lattice 140 and/or the grammar or language model 160 can be non-deterministic finite-state transducers. In this case, these non-deterministic finite-state transducers can be determinized using the various techniques disclosed in "Finite-state transducers in Language and Speech Processing", M. Mohri, *Computational Linguistics*, 23:2, p. 269-312, 1997, U.S patent application Ser. No. 09/165,423, filed Oct. 2, 1998, and/or U.S. Pat. No. 6,073,098 to Buchsbaum et al., each incorporated herein by reference in its entirety.

In contrast, in various exemplary embodiments of the systems and methods according to this invention, in the multimodal recognition or meaning system 1000 shown in FIG. 2, the automatic speech recognition system 100 uses a grammar or language model lattice 160 that is obtained from the recognized gestural input received in parallel with the speech signal 105. This is shown in greater detail in FIG. 2. In this way, the output of the gesture recognition system 200 can be used to compensate for uncertainties in the automatic speech recognition system.

Alternatively, in various exemplary embodiments of the systems and methods according this invention, the output of the automatic speech recognition system 100 and output of the gesture recognition system 200 can be combined only after each output is independently obtained. In this way, it becomes possible to extract meaning from the composition of two or more different input modes, such as the two different input modes of speech and gesture.

Furthermore, it should be appreciated that, in various exemplary embodiments of the systems and methods according to this invention, the output of the gesture recognition system 200 can be used to provide compensation to the automatic speech recognition system 100. Additionally, their combined output can be further processed to extract meaning from the combination of the two different input modes. In general, when there are two or more different input modes, any of one or more of the input modes can be used to provide compensation to one or more other ones of the input modes.

Thus, it should further be appreciated that, while the following detailed description focuses on speech and gesture as the two input modes, any two or more input modes that can provide compensation between the modes, which can be combined to allow meaning to be extracted from the two or more recognized outputs, or both, can be used in place of, or in addition to, the speech and gesture input modes discussed herein.

In particular, as shown in FIG. 2, when speech and gesture are the implemented input modes, a multimodal user input device 400 includes a gesture input portion 410 and a speech input portion 420. The gesture input portion 410 outputs a gesture signal 205 to a gesture recognition system 200 of the multimodal recognition and/or meaning system 1000. At the same time, the speech input portion 420 outputs the speech signal 105 to the automatic speech recognition system 100. The gesture recognition system 200 generates a gesture recognition lattice 255 based on the input gesture signal 205 and outputs the gesture recognition lattice 255 to a multimodal parser and meaning recognition system 300 of the multimodal recognition and/or meaning system 1000.

In those various exemplary embodiments that provide compensation between the gesture and speech recognition systems 200 and 100, the multimodal parser/meaning recognition system 300 generates a new grammar or language model lattice 160 for the utterance recognition subsystem 170 of the automatic speech recognition system 100 from the gesture recognition lattice 255. In particular, this new grammar or language model lattice 160 generated by the multimodal parser/meaning recognition system 300 is specific to the particular sets of gestural inputs generated by a user through the gesture input portion 410 of the multimodal user input device 400. Thus, this new grammar or language model lattice 160 represents all of the possible spoken strings that can successfully combine with the particular sequence of gestures input by the user through the gesture input portion 410. That is, the recognition performed by the automatic speech recognition system 100 can be improved because the particular grammar or language model lattice 160 being used to recognize that spoken utterance is highly specific to the particular sequence of gestures made by the user.

The automatic speech recognition system 100 then outputs the recognized possible word sequence lattice 175 back to the multimodal parser/meaning recognition system 300. In those various exemplary embodiments that do not extract meaning from the combination of the recognized gesture and the recognized speech, the recognized possible word sequences lattice 175 is then output to a downstream processing task. The multimodal recognition and/or meaning system 1000 then waits for the next set of inputs from the multimodal user input device 400.

In contrast, in those exemplary embodiments that additionally extract meaning from the combination of the recognized gesture and the recognized speech, the multimodal parser/meaning recognition system 300 extracts meaning from the combination of the gesture recognition lattice 255 and the recognized possible word sequences lattice 175. Because the spoken utterances input by the user through the speech input portion 420 are presumably closely related to the gestures input at the same time by the user through the gesture input portion 410, the meaning of those gestures can be tightly integrated with the meaning of the spoken input generated by the user through the speech input portion 420.

The multimodal parser/meaning recognition system 300 outputs a recognized possible meaning lattice 375 in addition to, or in place of, one or both of the gesture recognition lattice 255 and/or the recognized possible word sequences lattice 175. In various exemplary embodiments, the multimodal parser and meaning recognition system 300 combines the recognized lattice of possible word sequences 175 generated by the automatic speech recognition system 100 with the gesture recognition lattice 255 output by the gesture recognition system 200 to generate the lattice of possible meaning sequences 375 corresponding to the multimodal gesture and speech inputs received from the user through the multimodal user input device 400.

Moreover, in contrast to both of the embodiments outlined above, in those exemplary embodiments that only extract meaning from the combination of the recognized multimodal inputs, the multimodal parser/meaning recognition system 300 does not generate the new grammar or language model lattice 160. Thus, the gesture recognition lattice 255 does not provide compensation to the automatic speech recognition system 100. Rather, the multimodal parser/meaning recognition system 300 only combines the gesture recognition lattice 255 and the recognized possible word sequences lattice 175 to generate the recognition meaning lattice 375.

When the gesture recognition system 200 generates only a single recognized possible sequence of gestures as the gesture recognition lattice 255, that means there is essentially no uncertainty in the gesture recognition. In this case, the gesture recognition lattice 255 provides compensation to the automatic speech recognition system 100 for any uncertainty in the speech recognition process. However, the gesture recognition system 200 can generate a lattice of n possible recognized gesture sequences as the gesture recognition lattice 255. This recognizes that there may also be uncertainty in the gesture recognition process.

In this case, the gesture recognition lattice 255 and the word lattice 155 provide mutual compensation for the uncertainties in both the speech recognition process and the gesture recognition process. That is, in the face of this uncertainty, the best, i.e., most-probable, combination of one of the n-best word sequences in the word lattice 155 with one of the n-best gesture sequences in the gesture recognition lattice may not include the best recognition possible sequence from either the word lattice 155 or the gesture recognition lattice 255. For example, the most-probable sequence of gestures in the gesture recognition lattice may combine only with a rather low-probability word sequence through the word lattice, while the most-probable word sequence may combine well only with a rather low-probability gesture sequence. In contrast, a medium-probability word sequence may match very well with a medium-probability gesture sequence. Thus, the net probability of this latter combination of word and gesture sequences may be higher than the probability of the combination of the best word sequence with any of the gesture sequences through the gesture recognition lattice 255 and may be higher than the probability of the combination of the best gesture sequence with any of the word sequences through the lattice of possible word sequences 155. In this way, mutual compensation is provided between the gesture recognition system 200 and the automatic speech recognition system 100.

Figure 3:
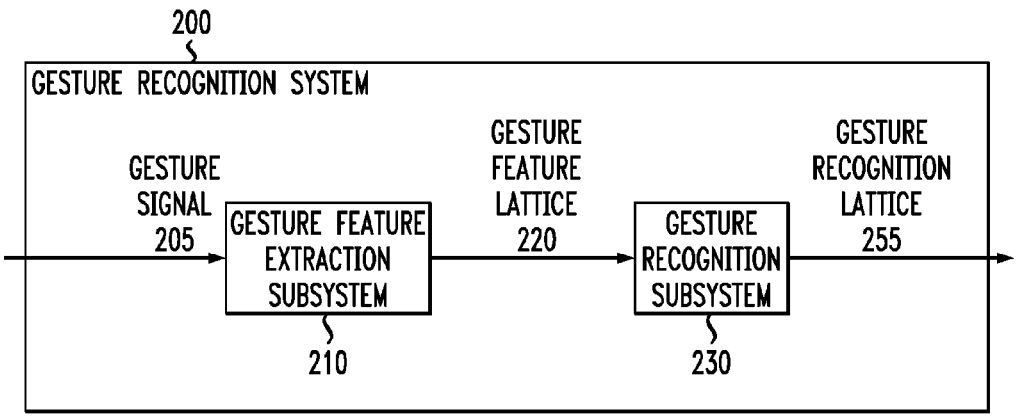
FIG. 3 is a block diagram illustrating in greater detail one exemplary embodiment of the gesture recognition system of FIG. 2.
Figure 4:
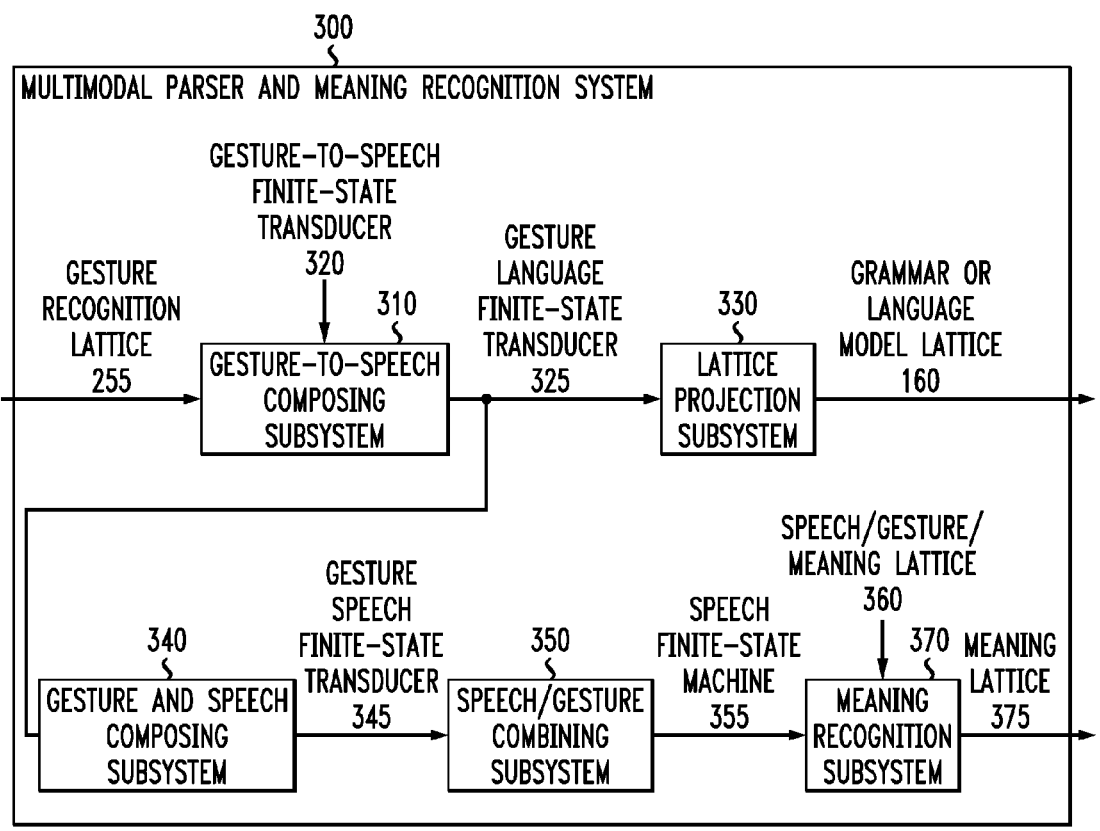
FIG. 4 is a block diagram illustrating in greater detail one exemplary embodiment of the multimodal parser and meaning recognition system of FIG. 2.
Figure 5:
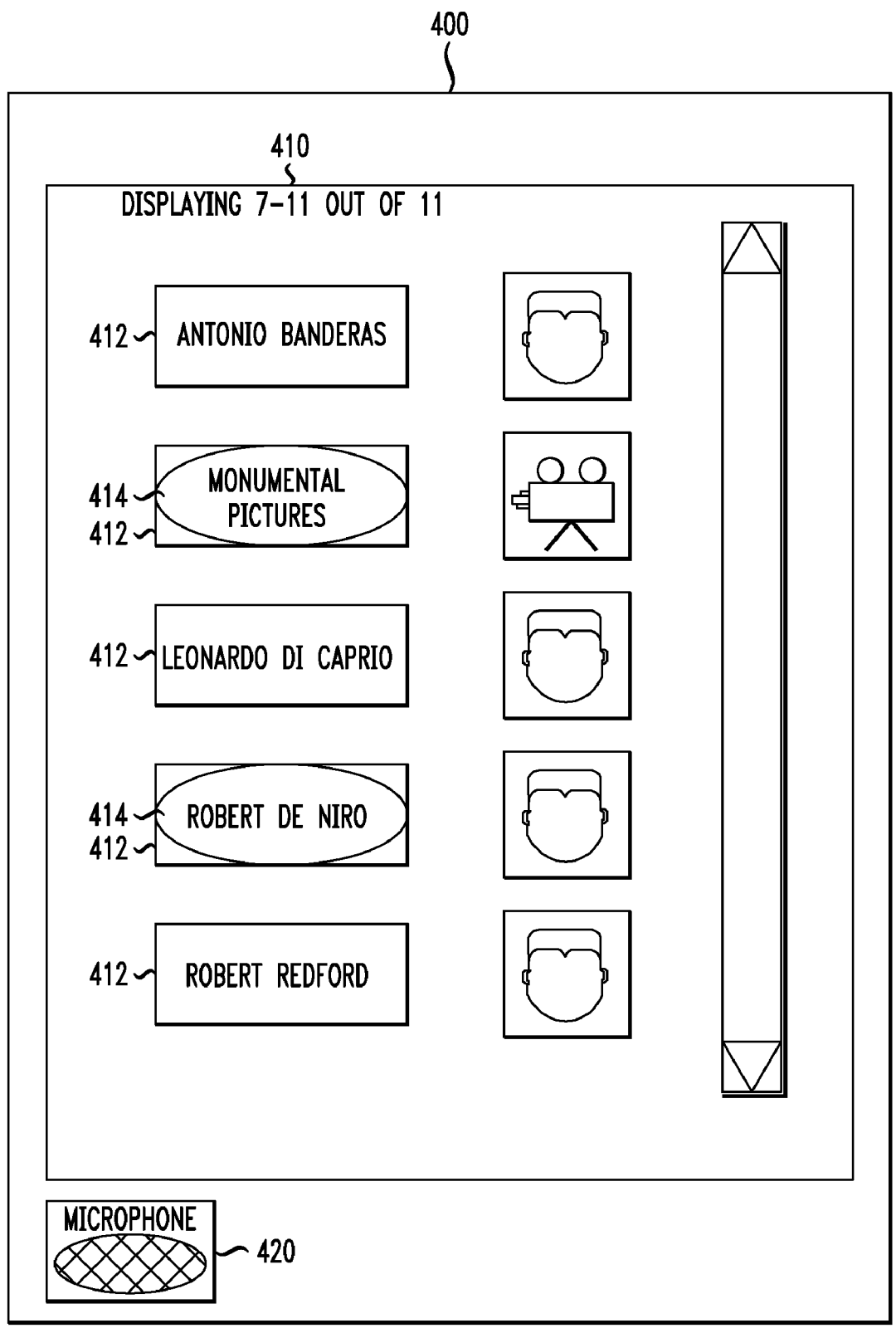
FIG. 5 is a block diagram illustrating in greater detail the first exemplary embodiment of the multimodal user input device of FIG. 2.

FIGS. 3-5 illustrate in greater detail various exemplary embodiments of the gesture recognition system 200, the multimodal parser/meaning recognition system 300, and the multimodal user input device 400. In particular, as shown in FIG. 3, one exemplary embodiment of the gesture recognition system 200 includes a gesture feature extraction subsystem 210 and a gesture recognition subsystem 230. Various other exemplary embodiments may include a gesture language model lattice and a gesture meaning subsystem. In operation, gesture utterances are input through the gesture input portion 410 of the multimodal user input device 400, which converts the movements of an input device, such as a mouse, a pen, a trackball, a track pad or any other known or later-developed gestural input device, into an electronic gesture signal 205. At the same time, the multimodal user input device 400 converts the gestural input into digital ink that can be viewed and understood by the user. This is shown in greater detail in FIG. 5.

The gesture feature extraction subsystem 210 converts the motions of the gesture input device represented by the gesture signal 205 into a gesture feature lattice 220. As disclosed in Johnston 1-3, the various gestures that can be made can be as simple as pointing gestures to a particular information element at a particular location within the gesture input portion 410 of the multimodal user input device 400, or can be as complex as a specialized symbol that represents a type of military unit on a military map displayed in the gesture input portion 410 of the multimodal user input portion 400 and includes an indication of how the unit is to move, and which unit is to move and how far that unit is to move, as described in detail in Johnston 1.

The gesture feature lattice 220 is input to the gesture recognition subsystem 230. The gesture recognition subsystem 230 may be implemented as a neural network, as a Hidden-Markov Model (HMM) or as a simpler template-based gesture classification algorithm. The gesture recognition subsystem 230 converts the gesture feature lattice 220 into the gesture recognition lattice 255. The gesture recognition lattice 255 includes the identities of graphical elements against which diectic and other simple "identification" gestures are made, possible recognition of more complex gestures that the user may have made and possibly the locations on the displayed graphics where the more complex gesture was made, such as in Johnston 1, and the like. As shown in FIG. 2, the gesture recognition system 200 outputs the gesture recognition lattice 255 to the multimodal parser/meaning recognition system 300.

It should be appreciated that the gesture feature recognition subsystem 210 and the gesture recognition subsystem 230 can each be implemented using any known or later-developed system, circuit or technique that is appropriate. In general, the entire gesture recognition system 200 can be implemented using any known or later-developed system that generates a directed graph from a gesture input.

For example, one known system captures the time and location or locations of the gesture. Optionally, these inputs are then normalized and/or rotated. The gestures are then provided to a pattern classification device that is implemented as part of the gesture feature recognition subsystem 210. In various exemplary embodiments, this pattern classification device is a template matching system, which transforms the gesture into a feature vector. In various other exemplary embodiments, this pattern classification device is a neural network or a Hidden Markov Model that has been trained to recognize certain patterns of one or more temporally and/or spatially related gesture components as a specific set of features.

When a single gesture is formed by two or more temporally and/or spatially related gesture components, those gesture components can be combined into a single gesture either during the recognition process or by the multimodal parser/meaning recognition system 300. Once the gesture features are extracted, the gesture recognition subsystem 230 combines the temporally adjacent gestures into a lattice of one or more recognized possible gesture sequences that represent how the recognized gestures follow each other in time.

Figure 7:
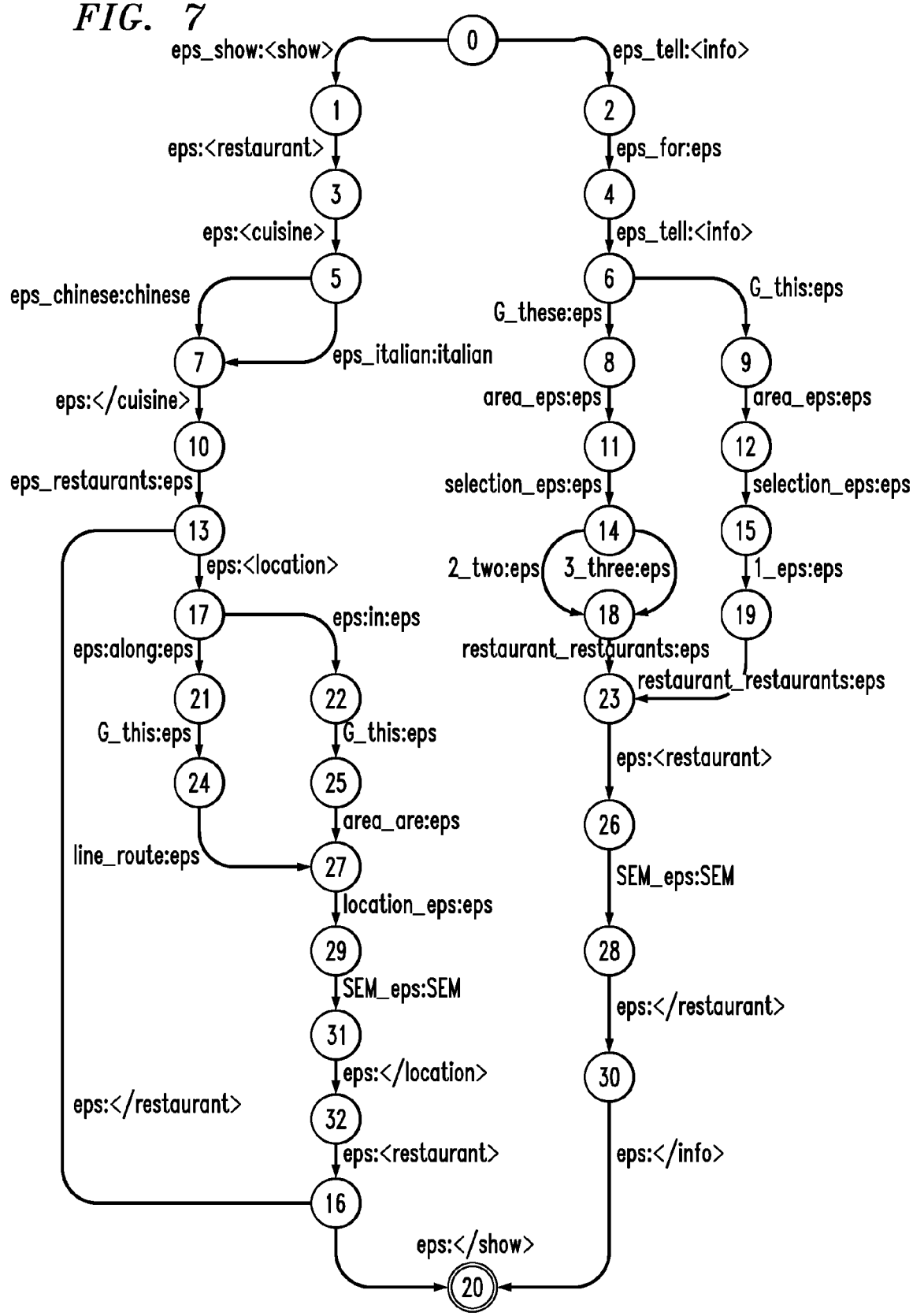
FIG. 7 is one exemplary embodiment of a multimodal three-tape finite-state automaton representing the multimodal context free grammar fragment shown in FIG. 6.
Figure 8:
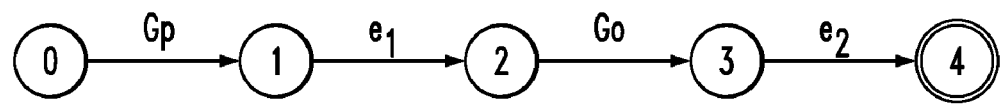
FIG. 8 is one exemplary embodiment of a gesture finite-state machine generated by recognizing the gesture inputs shown in the exemplary embodiment of the multimodal user input device shown in FIG. 5.

In various exemplary embodiments, the multimodal parser and meaning recognition system 300 can be implemented using a single three-tape finite-state device that inputs the output lattices from the speech recognition system 100 and the gesture recognition system 200 and directly obtains and outputs a meaning result. In various exemplary embodiments, the three-tape finite-state device is a three-tape grammar model that relates the gestures and the words to a meaning of the combination of a gesture and a word. FIG. 7 shows a portion of such a three-tape grammar model usable in the multimodal parser and meaning recognition system 300 to generate a meaning output from gesture and speech recognition inputs. In general, the multimodal parser and meaning recognition system 300 can be implemented using an n-tape finite-state device that inputs n−1 lattices from a plurality of recognition systems usable to recognize an utterance having a plurality of different modes.

FIG. 4 shows the multimodal parser/meaning recognition system 300 in greater detail. As shown in FIG. 4, the multimodal parser/meaning recognition system 300 may include one or more of a gesture-to-speech composing subsystem 310, a gesture-to-speech finite-state transducer 320, a lattice projection subsystem 330, a gesture and speech composing subsystem 340, a speech/gesture combining subsystem 350, a speech/gesture/meaning lattice 360 and/or a meaning recognition subsystem 370. In particular, the gesture-to-speech composing subsystem 310 inputs the gesture recognition lattice 255 output by the gesture recognition system 200 and composes it with the gesture-to-speech finite-state transducer 320 to generate a gesture/language finite-state transducer 325. The gesture/language finite-state transducer 325 is output to both the lattice projection subsystem 330 and the gesture and speech composing subsystem 340.

The lattice projection subsystem 330 generates a projection of the gesture/language finite-state transducer 325 and outputs the projection of the gesture/language finite-state transducer 325 as the grammar or language model lattice 160 to the automatic speech recognition system 100. Thus, if the multimodal parser/meaning recognition system 300 does not also extract meaning, the gesture and speech composing subsystem 340, the speech/gesture combining subsystem 350, the speech/gesture/meaning lattice 360 and the meaning recognition subsystem 370 can be omitted. Similarly, if the multimodal parser/meaning recognition system 300 does not generate a new grammar or language model lattice 160 for the automatic speech recognition system 100, at least the lattice projection subsystem 330 can be omitted.

In those various embodiments that combine the gesture recognition lattice 255 and the recognized possible lattice of word sequences 175, whether or not the automatic speech recognition 100 has generated the lattice of possible word sequences 175 based on using the projection of the gesture/language finite-state transducer 325 as the grammar or language model or lattice 160, the lattice of possible word sequences 175 is input by the multimodal parser/meaning recognition system 300. In particular, the gesture and speech composing subsystem 340 inputs both the lattice of possible word sequences 175 and the gesture/language finite-state transducer 325. In those various exemplary embodiments that do not use the output of the gesture recognition system 200 to provide compensation between the speech and gesture recognition systems 100 and 200, the gesture/language finite-state transducer 325 can be generated using any known or later-developed technique for relating the gesture recognition lattice 255 to the recognized possible lattice of word sequences 175 in place of the gesture-to-speech composing subsystem 310 and the gesture-to-speech finite-state transducer 320.

In those various exemplary embodiments that extract meaning from the multimodal inputs, the gesture and speech composing subsystem 340 composes these lattices to generate a gesture/speech finite-state transducer 345. The gesture and speech composing subsystem 340 outputs the gesture/speech finite-state transducer 345 to the speech/gesture combining subsystem 350. The speech/gesture combining subsystem 350 converts the gesture/speech finite-state transducer 345 to a gesture/speech finite-state machine 355. The gesture/speech finite-state machine 355 is output by the speech/gesture combining subsystem 350 to the meaning recognition subsystem 370. The meaning recognition subsystem 370 composes the gesture/speech finite-state machine 355 with the speech/gesture/meaning finite-state transducer 360 to generate a meaning lattice 375. The meaning lattice 375 combines the recognition of the speech utterance input through the speech input portion 420 and the recognition of the gestures input through the gesture input portion 410 of the multimodal user input device 400. The most probable meaning is then selected from the meaning lattice 375 and output to a downstream task.

It should be appreciated that the systems and methods disclosed herein use certain simplifying assumptions with respect to temporal constraints. In multi-gesture utterances, the primary function of temporal constraints is to force an order on the gestures. For example, if a user generates the spoken utterance "move this here" and simultaneously makes two gestures, then the first gesture corresponds to the spoken utterance "this", while the second gesture corresponds to the spoken utterance "here". In the various exemplary embodiments of the systems and methods according to this invention described herein, the multimodal grammars encode order, but do not impose explicit temporal constraints. However, it should be appreciated that there are multimodal applications in which more specific temporal constraints are relevant. For example, specific temporal constraints can be relevant in selecting among unimodal and multimodal interpretations. That is, for example, if a gesture is temporally distant from the speech, then the unimodal interpretation should be treated as having a higher probability of being correct. Methods for aggregating related inputs are disclosed in U.S. Application, which is incorporated herein by reference in its entirety.

To illustrate one exemplary embodiment of the operation of the multimodal recognition and/or meaning system 1000, the multimodal user input device 400 includes, for example, the gesture input portions 410 and the speech input portion 420 shown in FIG. 5. In particular, the gesture input portion 410 displays a graphical user interface that allows the user to direct either e-mail messages or pager messages to the various persons, departments, and/or organizations represented by the objects 412 displayed in the gesture input portion 410. The multimodal user input device 400 also allows the user to input spoken commands to the speech input portion, or microphone, 420. For simple illustration, further assume that the user has generated the two gestures 414 shown in FIG. 5 and has spoken the utterance "e-mail this person and that organization" in association with generating the gestures 414 against the graphical user interface object 412 labeled "Robert DeNiro" and the graphical user interface object 412 labeled "Monumental Pictures", respectively.

The structure interpretation of multimodal commands of this kind can be captured declaratively in a multimodal context-free grammar. A multimodal context-free grammar can be defined formally as the quadruple MCFG as follows:

TABLE 1

MCFG = <N, T, P, S> where
N is the set of non-terminals;
P is the set of projections of the form:
  $A \to \alpha$ where $A \in N$ and $\alpha \in (N \cup T)^*$;
S is the start symbol for the grammar;
T is the set of terminals:
  $((W \cup \epsilon) \times (G \cup \epsilon) \times (M \cup \epsilon))^+$,
where W is the vocabulary of the speech;
G is the vocabulary of gesture:
G = (GestureSymbols ∪ EventSymbols);
GestureSymbols = {Gp, Go, Gpf, Gpm . . .};
Finite collections of EventSymbols = {$e_1, e_2 \ldots$}; and
M is the vocabulary that represents meaning and includes EventSymbols ⊂ M.

In general, a context-free grammar can be approximated by a finite-state automaton. The transition symbols of the finite-state automaton are the terminals of the context-free grammar. In the case of the multimodal context-free grammar defined above, these terminals contain three components, W, G and M. With respect to the discussion outlined above regarding temporal constraints, more specific temporal constraints than order can be encoded in the finite-state approach by writing symbols representing the passage of time onto the gesture tape and referring to such symbols in the multimodal grammar.

In the exemplary embodiment of the gesture input portion 410 shown in FIG. 5, the gestures 414 are simple deictic circling gestures. The gesture meaning subsystem 250 assigns semantic types to each gesture 414 based on the underlying portion of the gesture input portion 410 against which the gestures 414 are made. In the exemplary embodiment shown in FIG. 5, the gestures 414 are made relative to the objects 412 that can represent people, organizations or departments to which an e-mail message or a pager message can be directed. If the gesture input portion 410 were instead a map, the gestures would be referenced against particular map coordinates, where the gesture indicates the action to be taken at particular map coordinates or the location of people or things at the indicated map location.

In Johnston 4 and the incorporated 253 application compared with a feature-based multimodal grammar, these semantic types constitute a set of atomic categories which make the relevant distinctions for gesture events to predict speech events and vice versa. For example, if the gesture is a deictic, i.e., pointing, gesture to an object in the gesture input portion 410 that represents a particular person, then spoken utterances like "this person", "him", "her", and the like, are the preferred or predicted speech events and vice versa. These categories also play a role in constraining the semantic representation when the speech is underspecified with respect to the semantic type, such as, for example, spoken utterances like "this one".

In Johnston 4 and the incorporated 253 application, the gesture symbols G can be organized into a type hierarchy reflecting the ontology of the entities in the application domain. For example, in the exemplary embodiment of the gesture input portion 410 shown in FIG. 5, a pointing gesture may be assigned the general semantic type "G". This general semantic gesture "G" may have various subtypes, such as "Go" and "Gp", where "Go" represents a gesture made against an organization object, while the "Gp" gesture is made against a person object. Furthermore, the "Gp" type gesture may itself have subtypes, such as, for example, "Gpm" and "Gpf" for objects that respectively represent male and female persons.

The systems and methods for recognizing and representing gestures according to this invention provide an approach that can be used instead of, or in addition, to that discussed above and shown in FIGS. 1-5. Instead of, or in addition to, using atomic symbols in the multimodal grammar and the corresponding finite-state machines to represent different types of gestures, gesture interpretations are encoded as sequences of symbols. In this approach, each symbol conveys a specific attribute of the content of the gesture, such as type or number. Under this approach, the Gesture Symbols and Event Symbols in the multimodal grammar fragment, shown in Table 1 are instead defined as:

TABLE 2

GestureSymbols = {G, area, location, restaurant, 1, . . .};
EventSymbols = {SEM}

These definitions can be used instead of, or in addition to, the definitions of the Gesture Symbols and Event Symbols shown in Table 1.

Figure 12:
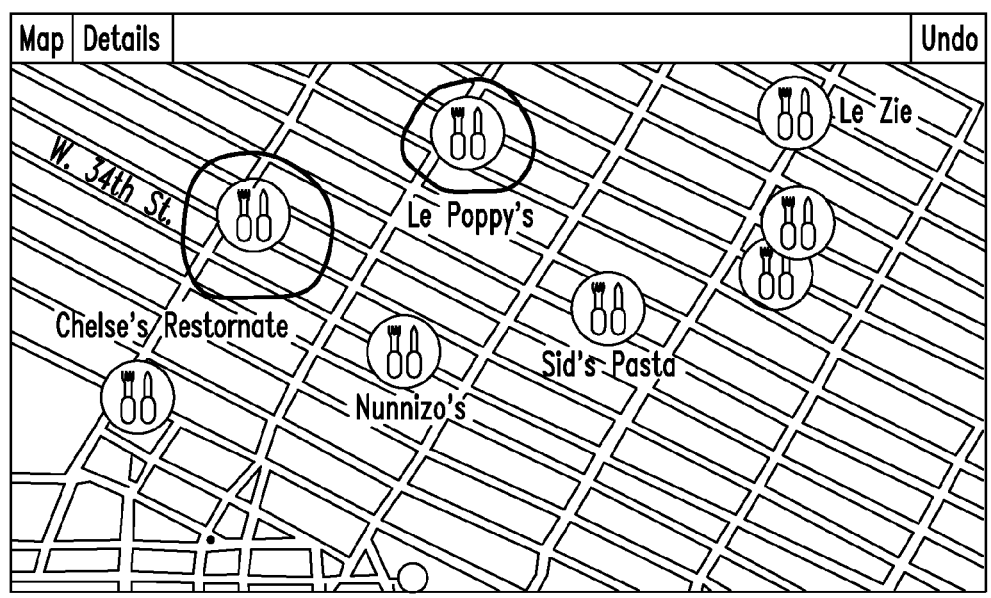
FIG. 12 is one exemplary embodiment of phone query callouts resulting from a user's request input into the multimodal user input device of FIG. 9.
Figure 13:
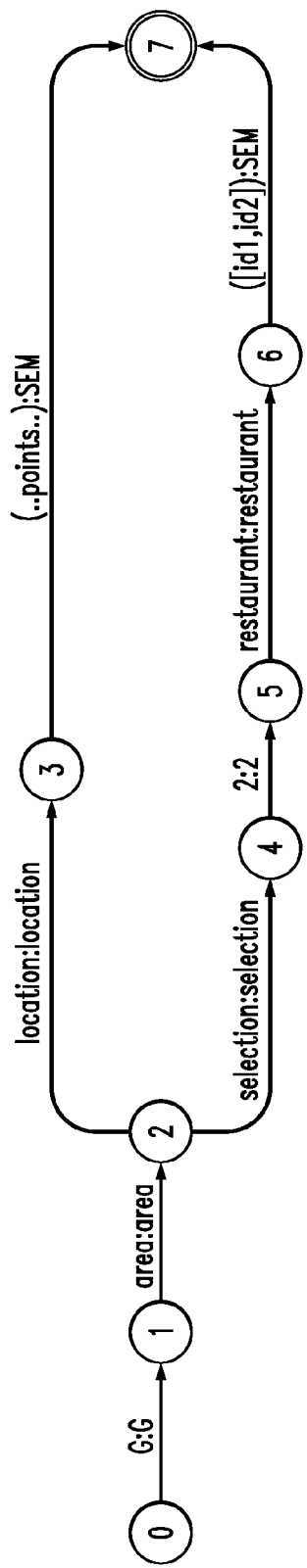
FIG. 13 is one exemplary embodiment of a gesture input finite-state transducer generated by recognizing the gesture inputs of a user inquiring about two restaurants.

FIG. 6 illustrates a fragment of a context-free grammar that is capable of handling a set of gestures and a set of spoken utterances that would be recognizable using the finite state machines shown in FIGS. 12 and 13. FIG. 7 illustrates a three-tape finite state automaton corresponding to the multimodal context-free grammar fragment shown in FIG. 6.

By decomposing the gesture symbols into sequences of symbols, it is easier to reference sets of entities of a specific type. In addition, a smaller number of symbols are required in the alphabet of symbols that represent the gestural content of the grammar. Further, decomposing the gesture symbols into sequences of symbols facilitates storing specific gesture content, discussed below, and aggregating adjacent selection gestures, as disclosed in the incorporated application.

Under this approach, for example, the gesture symbol complexes have a basic format such as:

G Form Meaning (Number Type) Sem

However, it should be appreciated that the gesture symbol complexes can be implemented in any appropriate format. The "FORM" term specifies the physical form of the gesture. In various exemplary embodiments, the "FORM" term can take such values as area, point, line and arrow. The "MEANING" term specifies the specific meaning of the form of the gesture. For example, if the value for the "FORM" term of a gesture is area, the value for the "MEANING" term of that "FORM" term can be location, selection or any other value that is appropriate. If the value of the "MEANING" term of that "FORM" term is selection, such that one or more specific entities are selected, the "NUMBER" term and the "TYPE" term can be used to further specify the entities that are or have been selected. In particular, the value for the "NUMBER" term specifies the number of entities selected, such as 1, 2, 3, "many" and the like. Similarly, the value for the "TYPE" term specifies a particular type of entity, such as restaurant, theatre and the like, as appropriate for the given implementation or use. A value of mixed can be used for the "TYPE" term when one or more associated gestures reference a collection of entities of different types. The "SEM" (short for semantics) term is a place holder for the specific content of the gesture, such as the points that make up an area or the identifiers (ids) of objects in a selection. To facilitate recomposing specific gestural content, specific content is mapped to a distinguished symbol, such as, the "SEM" term, while the other attributes of the gesture are mapped to themselves.

When using finite-state methods, in order to capture multimodal integration, it is desirable to abstract over specific aspects of gestural content. In the systems and methods according to this invention, abstraction is performed by representing the input gesture as a finite-state transducer that maps the specific contents of the input gesture to a distinguished symbol, such as, for example, the "SEM" term, while the other attributes of the input gesture are mapped to themselves. To perform multimodal integration, the output projection of the gesture finite-state transducer is used. After multimodal integration is completed, a projection of the gesture input and the meaning portions of the resulting finite-state machine is taken. The projection of the resulting finite-state machine is composed with the gesture input finite-state transducer to reintegrate the specific content of the gesture input which was left out of the finite-state process.

Thus, in the finite-state approach used in the systems and methods according to this invention, the specific content of the input gesture is essentially stored in the gesture finite-state transducer and a projection of the output of the gestural input finite-state transducer is used to conduct multimodal modal integration using finite-state devices. Multimodal integration is performed and a resulting finite-state device, which relates the gesture input and at least one other mode of multimodal input to meaning, is generated. After multimodal integration is performed, a projection of the resulting finite-state device is taken such that the projection contains the gesture input and the meaning portions of the resulting finite-state device. The specific content of the input gesture is then retrieved from the gesture finite-state transducer by composing the gesture finite-state transducer with the projection of the resulting finite-state device.

Figure 14:
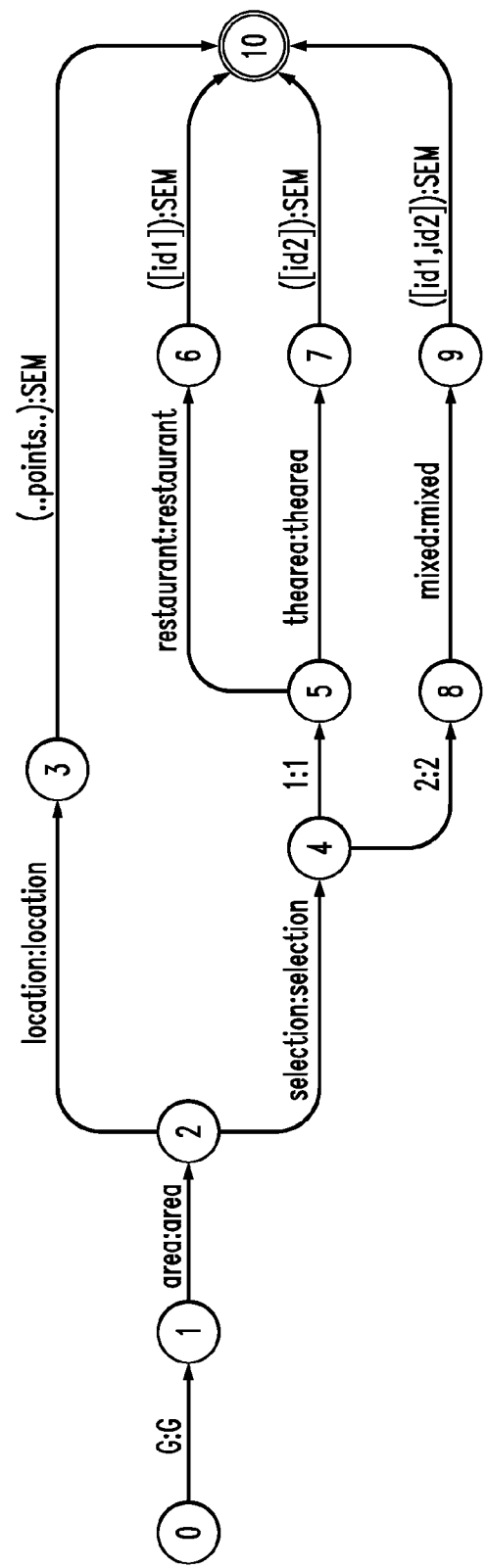
FIG. 14 is one exemplary embodiment of a gesture input finite-state transducer generated by recognizing the gesture inputs of a user inquiring about a restaurant and a theatre.

FIGS. 13 and 14 are examples of different transducers I:G, where G contains gesture symbols and I contains the gesture symbols and specific contents of the gesture. In particular, the G side contains information identifying the type of gesture and its properties. The I side contains the information on the G side. However, where the G side contains a place holder for the specific contents of the gesture, the I side contains the specific contents. Therefore, I and G differ only in cases where the gesture symbol on G is SEM. If the symbol on G is SEM, then I contains the specific content of the gesture. Accordingly, when there is specific content, such as a list of entities or points in the gesture stream, the symbol in G is the reserved symbol SEM and the specific content is placed on the I side opposite the SEM.

In addition, in one exemplary embodiment of the systems and methods of this invention, a projection, i.e., the gesture input finite-state machine, is then used to perform multimodal integration. Accordingly, in order to reintegrate the specific content of the input gesture after multimodal integration is performed, an output projection of the resulting meaning finite-state machine is composed with the gesture finite-state transducer.

In the finite-state automata approach used in the systems and methods according to this invention, in addition to capturing the structure of language with the finite-state device, meaning is also captured. This is significant in multimodal language processing, because the central goal is to capture how the multiple modes contribute to the combined interpretation. In the finite-state automata technique used in the systems and methods according to this invention, symbols are written onto the third tape of the three-tape finite-state automaton, which, when concatenated together, yield the semantic representation for the multimodal utterance.

Figure 9:
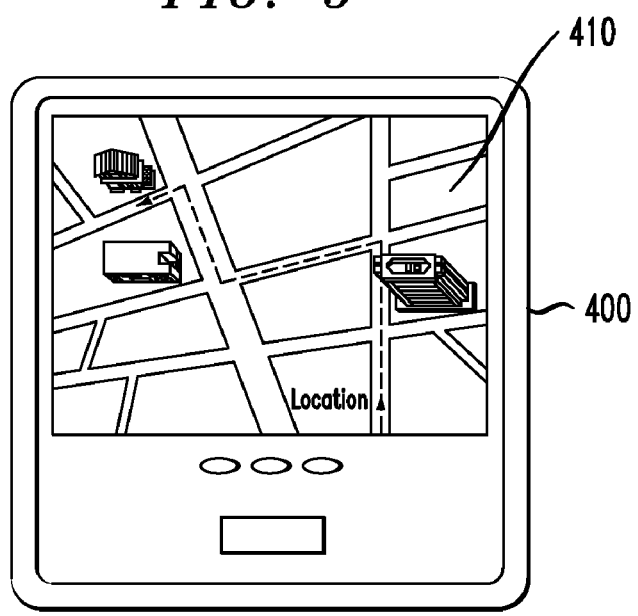
FIG. 9 is a second exemplary embodiment of a multimodal user input device.

FIG. 9 illustrates a second exemplary embodiment and application of a multimodal recognition and/or meaning system 1000 which uses the systems and methods for recognizing and representing gesture according to this invention. For example, in this second exemplary embodiment, the user interacts with a graphical interface displaying restaurant listings and a dynamic map showing locations and street information. The gesture input portion 410 can be used to display, for example, a graphical user interface that includes a working-city-guide application and navigation screen that, for example, enables mobile users to access restaurant and subway information for a city. In this example, the user is able to interact with the graphical interface to display restaurant listings and a dynamic map showing locations and street information. This graphical user interface responds to commands entered using pen-based gestures and/or spoken utterances.

The user is, for example, free to give commands or to reply to requests displayed on the graphical user interface using speech, by drawing on the display with a stylus, or using synchronous multimodal combinations of the available modes. The user can, for example, ask for the review, cuisine, phone number, address, or other information for a restaurant or set of restaurants. The working-city-guide application generates graphical callouts on the display.

Figure 10:
FIG. 10 is an exemplary embodiment of an unimodal pen command inputted into the second exemplary embodiment of the multimodal user input device shown in FIG. 9.

For example, a user can request to see restaurants using the spoken command "Show cheap Italian restaurants in Chelsea". The working-city-guide application will then display the appropriate map location and show the locations of the restaurants that meet the indicated criteria. Alternatively, the user can give the same command multimodally by circling an area on the map and uttering "Show cheap Italian restaurants in this neighborhood". As shown in FIG. 10, if the immediate environment is too noisy or public, the same command can be input solely using a writing gesture, by circling an area of the displayed map and by writing "cheap" and "Italian".

Figure 11:
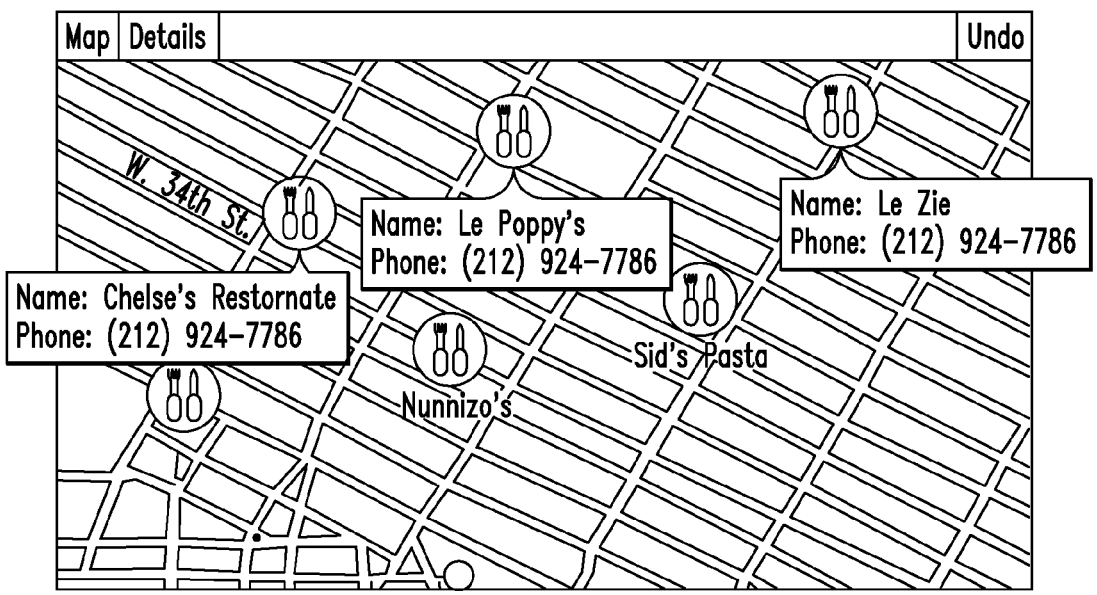
FIG. 11 is one exemplary embodiment of two area gestures input into the multimodal user input device of FIG. 9.

As shown in FIG. 11, for example, the user can speak the utterance "Phone numbers for these restaurants" and circle, for example, a total of three restaurants. As shown in FIG. 12, a callout with the restaurant name and number, such as for example, the text string, "Le Zie can be reached at 212-206-8686", is then displayed for one or more of the identified restaurants. Alternatively, any of the information seeking commands can also be input solely using gestures. For example, the user could alternatively have circled the restaurants and written phone. The user can also pan and zoom around the map using any of a variety of input modes. For example, the user can speak the utterance "show upper west side" or circle an area and speak the utterance "zoom in here".

FIG. 13 shows one exemplary embodiment of a resulting gesture lattice that is obtained when the user draws an area on the screen which contains two restaurants, that have identifiers id1 and id2. The arc labels of the gesture lattice are the symbols which define the gesture symbol complex. Further, if the user utters the spoken string "Show me Chinese restaurants in this neighborhood", then the top path, comprising states 0-2 and states 3-7, of the gesture lattice shown in FIG. 13 will be chosen when the multimodal finite-state device is applied. In contrast, if the user utters the spoken string "Tell me about these two restaurants", then the lower path, comprising states 0-2 and states 4-7, of the gesture lattice shown in FIG. 13 will be chosen.

FIG. 14 shows one exemplary embodiment of a resulting gesture lattice that is obtained when the user circles a restaurant and a theatre. In contrast, if the user utters the spoken string, "Tell me about this theatre", the middle path, comprising states 0-2, state 4, state 5, state 7 and state 10, of FIG. 14 will be chosen. Similarly, if the user utters the spoken string, "Tell me about these two", the bottom path, comprising the states 0-2, state 4 and states 8-10, of FIG. 14 will be chosen. In particular, the mixed path, is used when the user circles several entities and selects a specific one of the circled entities by type.

Accordingly, by splitting the symbols into symbol complexes, it is not necessary to have a unique symbol for "G_area_location", "G_area_selection_1_restaurant", "G_area_selection_2_restaurant", and the like, as would be required when using only the just first approach shown in FIGS. 1-5. Therefore, the number of required symbols in the alphabet of the gesture symbols can be reduced and possibly significantly reduced. In addition, in various exemplary embodiments, general categories are separately represented in the symbol complexes. Thus, in various exemplary embodiments, it is easier to reference to sets of entities of a specific. Accordingly, in various exemplary embodiments of the systems and methods for recognizing and representing gestures according to this invention, if the word place, in the spoken utterance, "Tell me about this place", referred to either a restaurant or a theatre, the word "place" could be associated with both arcs in the gesture lattice. In addition, splitting gesture symbols also facilitates in later aggregating the symbols, as well as in recovering specific gestural content in systems and methods which use finite state machines.

Figure 15:
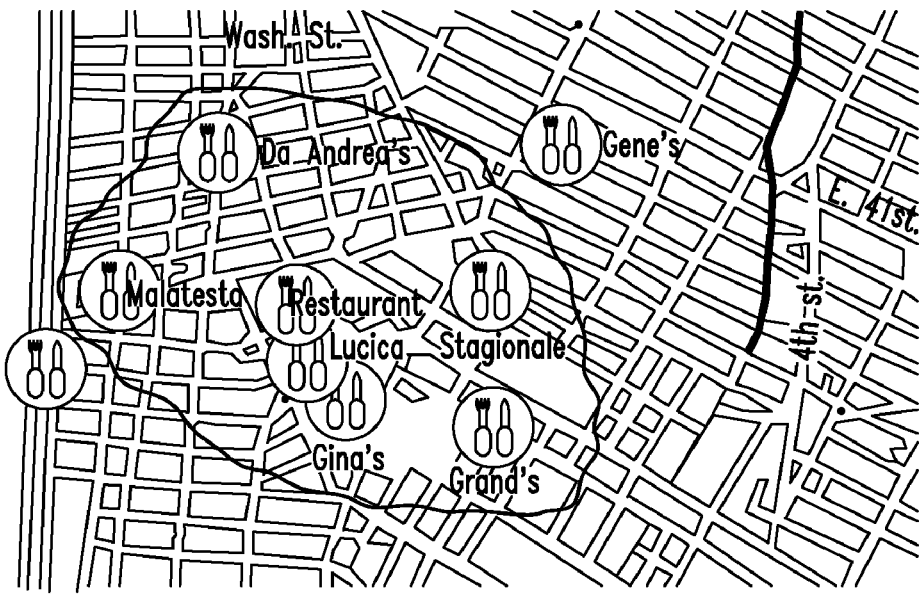
FIG. 15 is one exemplary embodiment of a command requesting the multimodal user input device shown in FIG. 9 to compare a large set of restaurants.

In various exemplary embodiments, the working-city-guide application can also provide a summary, one or more comparisons, and/or recommendations for an arbitrary set of restaurants. The output is tailored to the user's preferences based on a user model, which is, for example, based on answers to a brief questionnaire. For example, as shown in FIG. 15, the user could speak the utterance "compare these restaurants" and circle a large set of restaurants. In various exemplary embodiments, a number, such as, for example, the top three restaurants are then ranked according to the user model. In various exemplary embodiments, if the user is more concerned about price than food quality, the working-city-guide application would, for example, order, the selected restaurants by weighting price more highly than food quality in analyzing the selected restaurants.

The working-city-guide application can also provide subway directions. For example, if the user speaks the spoken utterance "How do I get to this place?" and circles one of the restaurants displayed on the map, the working-city-guide application will, for example, display a query or graphical callout, such as, for example, the text string "Where do you want to go from?" The user can then respond, for example, with a spoken utterance stating a location, by saying a location, such as, for example, "$25^{th}$ Street and $3^{rd}$ Avenue", with a gesture defining a location, for example, by writing "$25^{th}$ Street and $3^{rd}$ Avenue", or by pointing to $25^{th}$ Street and $3^{rd}$ Avenue on the map, or multimodally by speaking the spoken utterance "from here" and pointing to or circling the location on the map.

Figure 16:
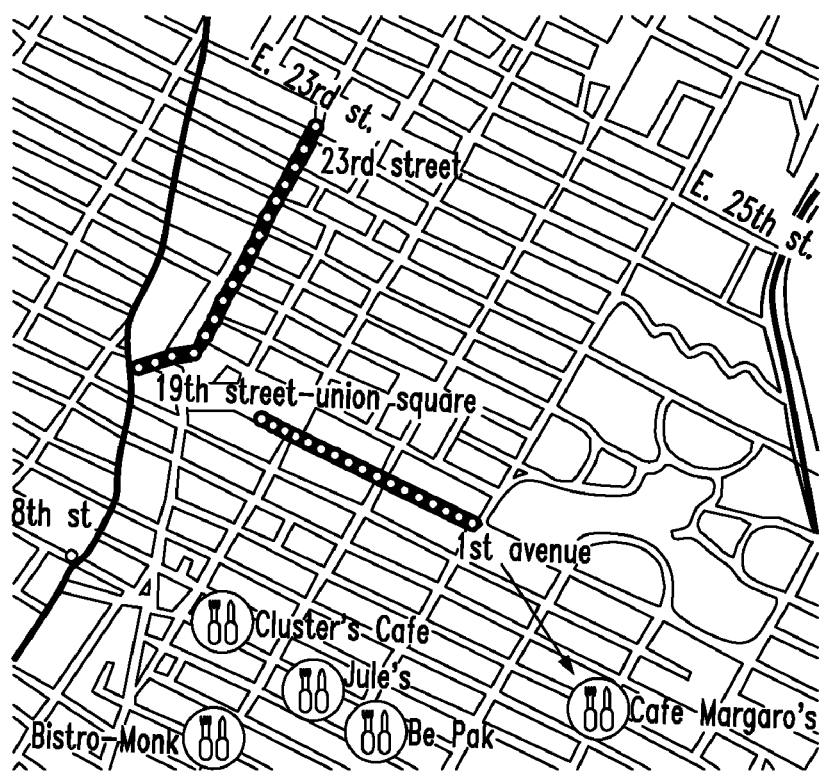
FIG. 16 is one exemplary embodiment of a multimodal subway-route-information application displayed on the multimodal user input device shown in FIG. 9.

The working-city-guide application then determines a subway route. In various exemplary embodiments, as appropriate, the working city-guide application generates a multimodal presentation indicating the series of actions the user needs to take will be displayed. In various exemplary embodiments, the working-city-guide application starts, for example, by zooming in on the first station and then gradually presenting each stage of the route along with a series of synchronized test-to-speech (TTS) prompts. FIG. 16 shows one exemplary embodiment of a resulting subway route.

Figure 17:
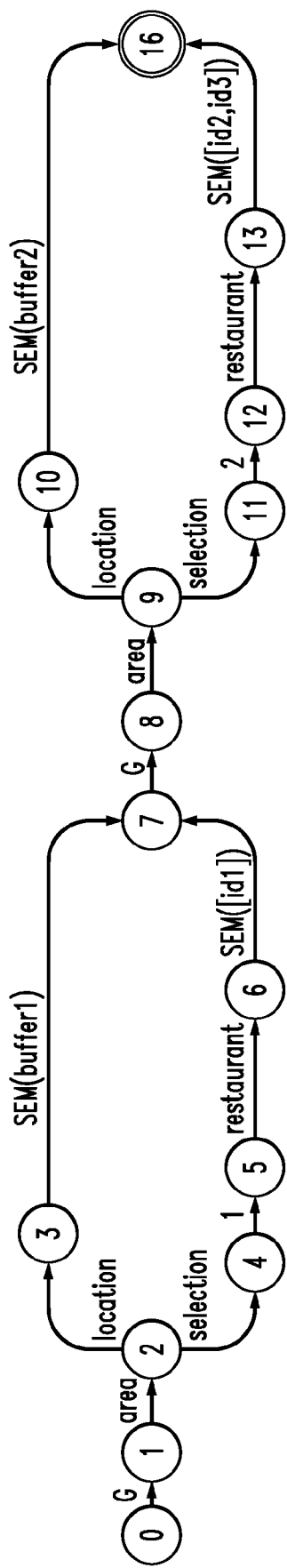
FIG. 17 is one exemplary embodiment of a resulting gesture lattice generated using one exemplary embodiment of a method for gesture representation according to this invention.

It should be thus be appreciated, from the preceding description of Table 2 and FIGS. 6-16, that the interpretations of electronic ink may be encoded as symbol complexes. In various exemplary embodiments the symbol complexes can have, for example, the form "G FORM MEANING (NUMBER TYPE) SEM". FIG. 17 shows, for example, the resulting gesture lattice of the gesture made in FIG. 11 using this exemplary embodiment of the symbol complexes according to this invention.

Systems and methods for abstracting over specific contents of information represented by finite-state methods are disclosed in U.S. Patent Application, which is incorporated herein by reference in its entirety. These systems and methods provide an approach that can be used to abstract over specific contents of the gestural content. For abstraction, the gesture lattice is converted to a gesture transducer I:G, where the G side is the set of gesture symbols (including SEM) and I contains both gesture symbols and the specific contents. The specific contents of the gestural input includes, for example, entities or points on the gesture input portion 410 that are selected by the user. Further, the specific content may, for example, be an identification number, i.e., an entity identifier, that represents the entity or point on the gesture input portion. For example, to convert the gesture lattice shown in FIG. 17 to a gesture transducer I:G, for example, the path, comprising states 6-7 and reciting SEM([id1]) in FIG. 17, becomes ([id1]): SEM and the path, comprising states comprising states 13-16 and reciting SEM([id2. id3]) in FIG. 17, becomes ([id2, id3]): SEM.

Similarly, a gesture transducer I:G can be generated by the gesture recognition system 200 based on the gestural input. In this case, the gesture transducer is converted to a gesture finite-state machine usable to carry out multimodal integration or any other applicable function using finite-state devices. For example, if the user circles two restaurants and the user says "phone numbers for these two restaurants" the gesture is represented as a transducer as shown in FIG. 13, where the transducer I:G has same symbol on each side except for the SEM arcs, which are split. In this case, to carry out the multimodal integration, or any other function performed with finite-state devices, a projection of the output of the transducer, that is, a projection of the gesture path G, is taken. Accordingly, the projection of the output of the gesture transducer is used to perform the applicable function using finite-state devices.

After the gesture symbols G and the words W are integrated using the finite-state devices G:W and G_W:M, for example, i.e., after multimodal integration, the gesture path G and meaning path M in the resulting finite-state device are used to re-establish the connection between the SEM symbols and their specific contents, for example entities or points selected by the user, that are stored in the I path of the gesture transducer I:G. In particular, in order to reintegrate the specific contents of the gesture, the gesture transducer I:G is composed with the gesture path G and meaning path M of the device resulting from multimodal integration (I:G o G:M=I: M). In addition, in order to output the meaning, the symbols on the M side are concatenated together. Further, when outputting the meaning, if the M symbol is SEM, the symbol on the I side is taken for that arc.

While a three-tape finite-state automaton is feasible in principle, currently available tools for finite-state language processing generally only support two-tape finite-state automata, i.e., finite-state transducers. Furthermore, speech recognizers typically do not support the use of a three-tape finite-state automaton as a language model. Accordingly, the multimodal recognition and/or meaning system 1000 implements this three-tape finite-state automaton approach by using a series of finite-state transducers in place of the single three-tape finite-state automaton shown in FIG. 18, as described below. In particular, the three-tape finite-state automaton shown in FIG. 18 and illustrated by the grammar fragment shown in FIG. 19 can be decomposed into an input component relating the gesture symbols G and the word symbols W and an output component that relates the input component to the meaning symbols M.

Figure 18:
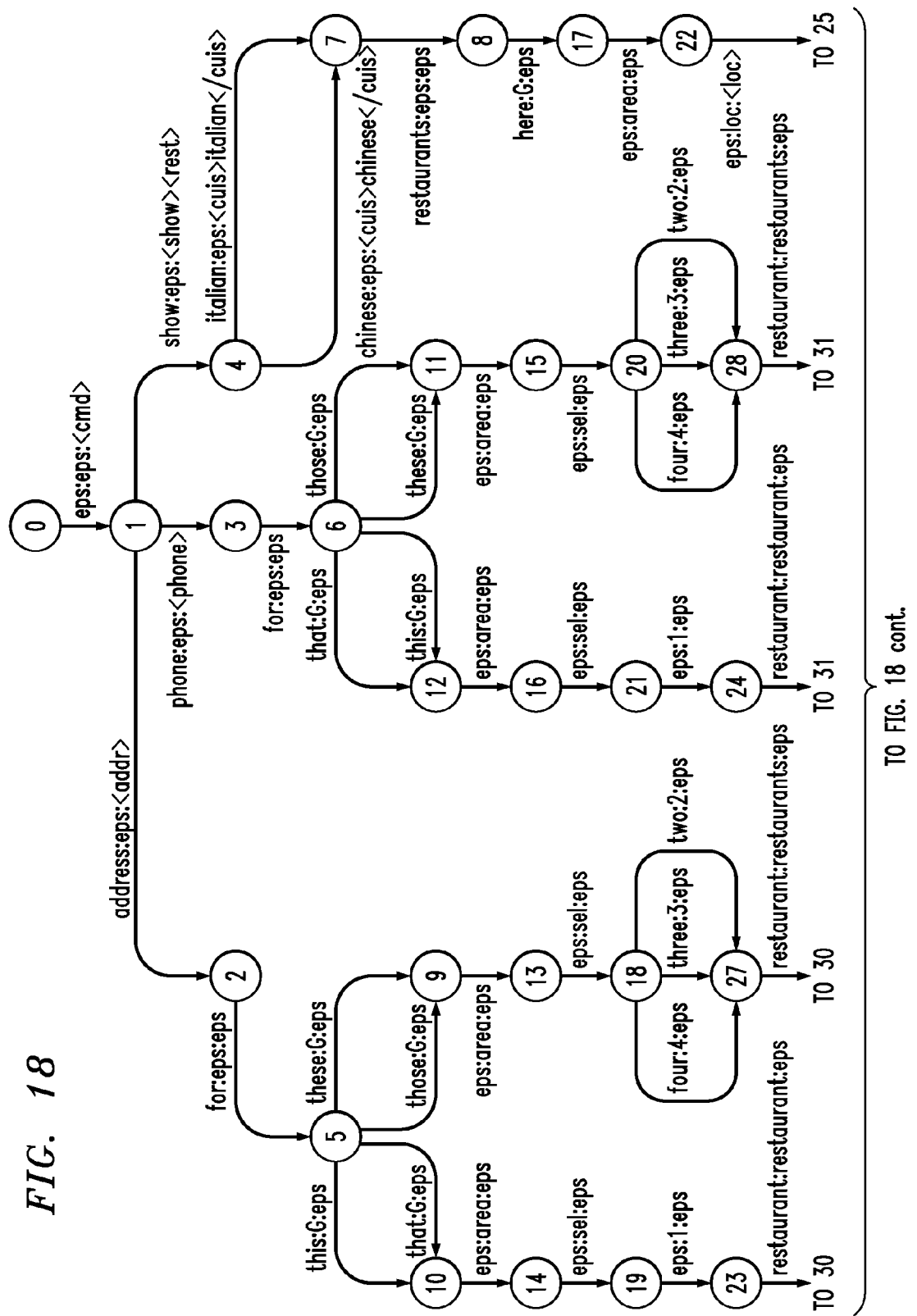
FIG. 18 is one exemplary embodiment of a three-tape multimodal finite-state automaton usable to recognize the multimodal inputs received from the exemplary embodiment of the multimodal user input device shown in FIG. 9.

FIG. 18 shows a three-tape finite-state automaton that corresponds to the grammar fragment shown in FIG. 19 and that is usable to recognize the meaning of the various spoken and gestural inputs that can be generated using the various exemplary graphical user interfaces displayable using the gesture input portion 410 of the multimodal user input devices 400 shown in FIGS. 5 and 9. The three-tape finite-state automaton shown in FIG. 18 is decomposed into the gesture-to-speech finite-state transducer shown in FIG. 20 and the speech/gesture/meaning finite-state transducer shown in FIG. 21.

Figure 20:
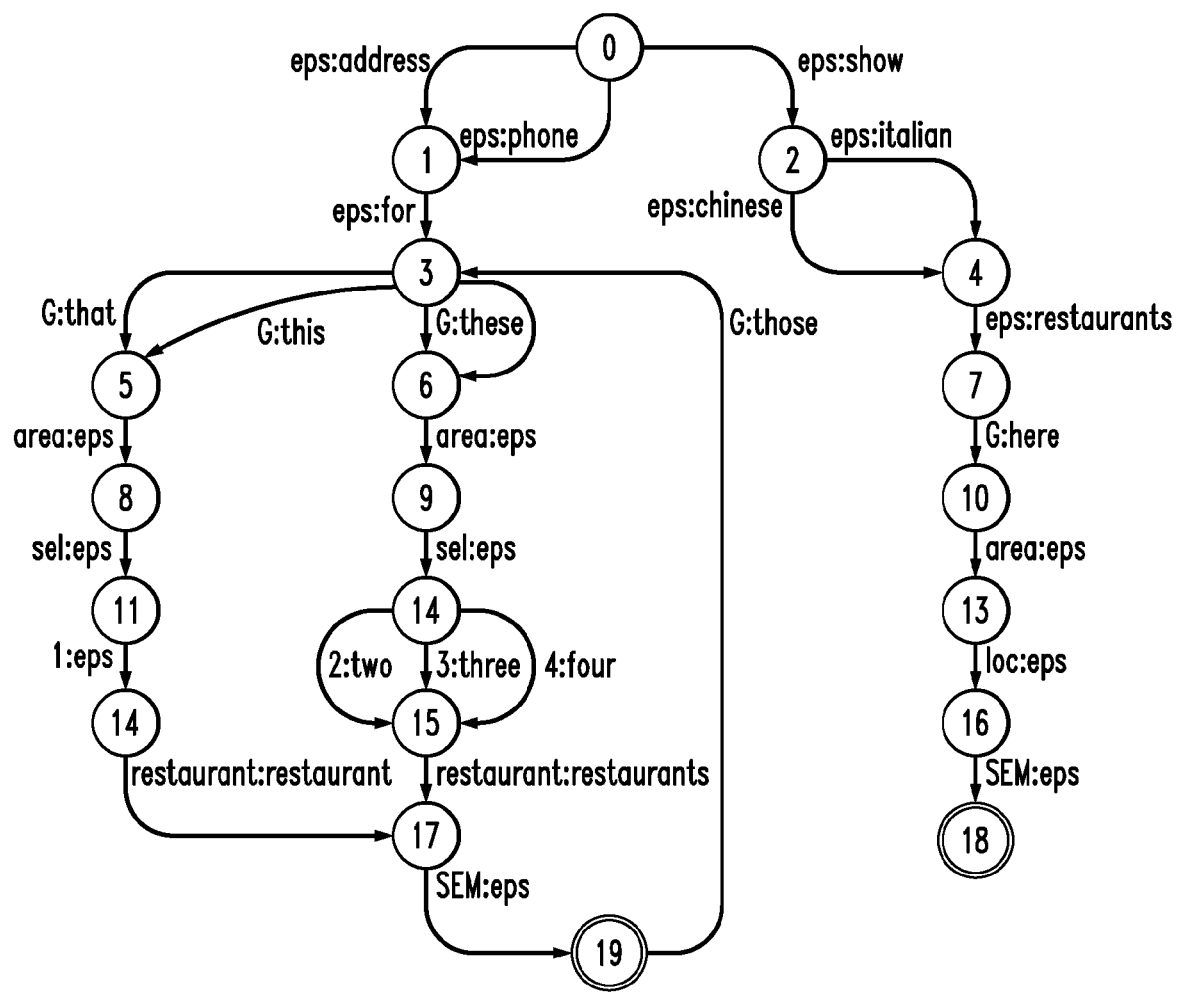
FIG. 20 is one exemplary embodiment of a gesture-to-speech finite-state transducer that represents the relationship between speech and gesture for the exemplary embodiment of the multimodal user input device shown in FIG. 9.

The gesture-to-speech finite-state transducer shown in FIG. 20 maps the gesture symbols G to the word symbols W that are expected to coincide with each other. Thus, in the exemplary embodiment of the multimodal user input device 400 shown in FIG. 5, the verbal pointers "that" and "this" are expected to be accompanied by the deictic gestures 414 made against either a department object, an organization object or a person object 412.

The gesture-to-speech transducer shown in FIG. 20 captures the constraints that the gestures, made by the user through the gesture input portion 410 of the multimodal user input device 400, place on the speech utterance that accompanies those gestures. Thus, a projection of the output tape of the gesture-to-speech finite-state transducer shown in FIG. 20 can be used, in conjunction with the recognized gesture string, such as the recognized gesture string shown in FIG. 23 that represents the gestures illustrated in the exemplary embodiment of the multimodal user input device 400 shown in FIG. 9, as a language model usable to constrain the possible sequences of words to be recognized by the utterance recognition subsystem 170 of the automatic speech recognition system 100.

It should be appreciated that, in those exemplary embodiments that do not also extract meaning, the further processing outlined below with respect to FIGS. 20-32 can be omitted. Similarly, in those exemplary embodiments that do not use one or more of the multimodal inputs to provide compensation to one or more of the other multimodal inputs, the processing outlined above with respect to FIGS. 20, 21 and 26 can be omitted.

Figure 21:
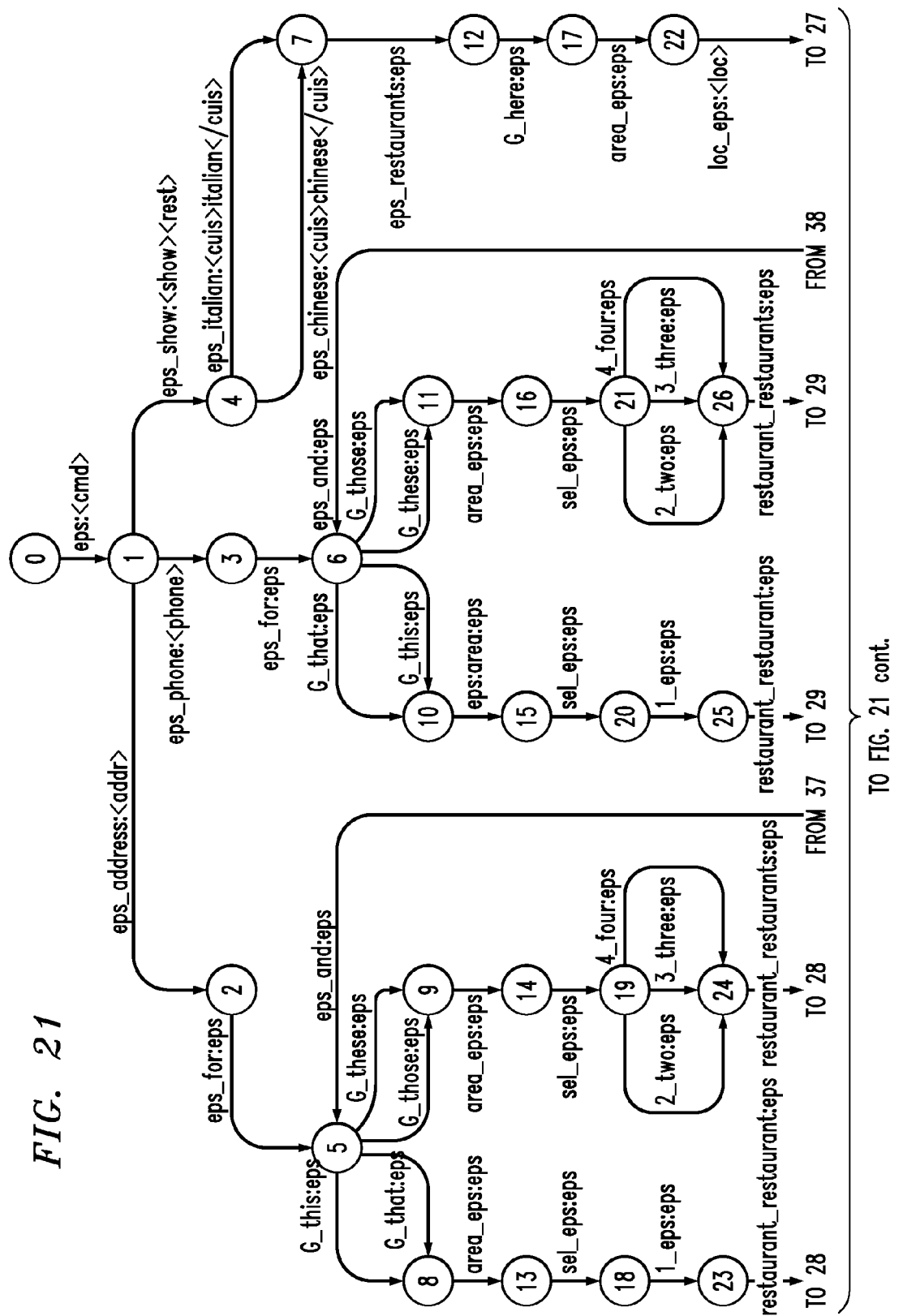
FIG. 21 is one exemplary embodiment of a speech/gesture/meaning finite-state transducer that represents the relationship between the combined speech and gesture symbols and the semantic meaning of the multimodal input for the exemplary embodiment of the multimodal input device shown in FIG. 9.
Figure 21:
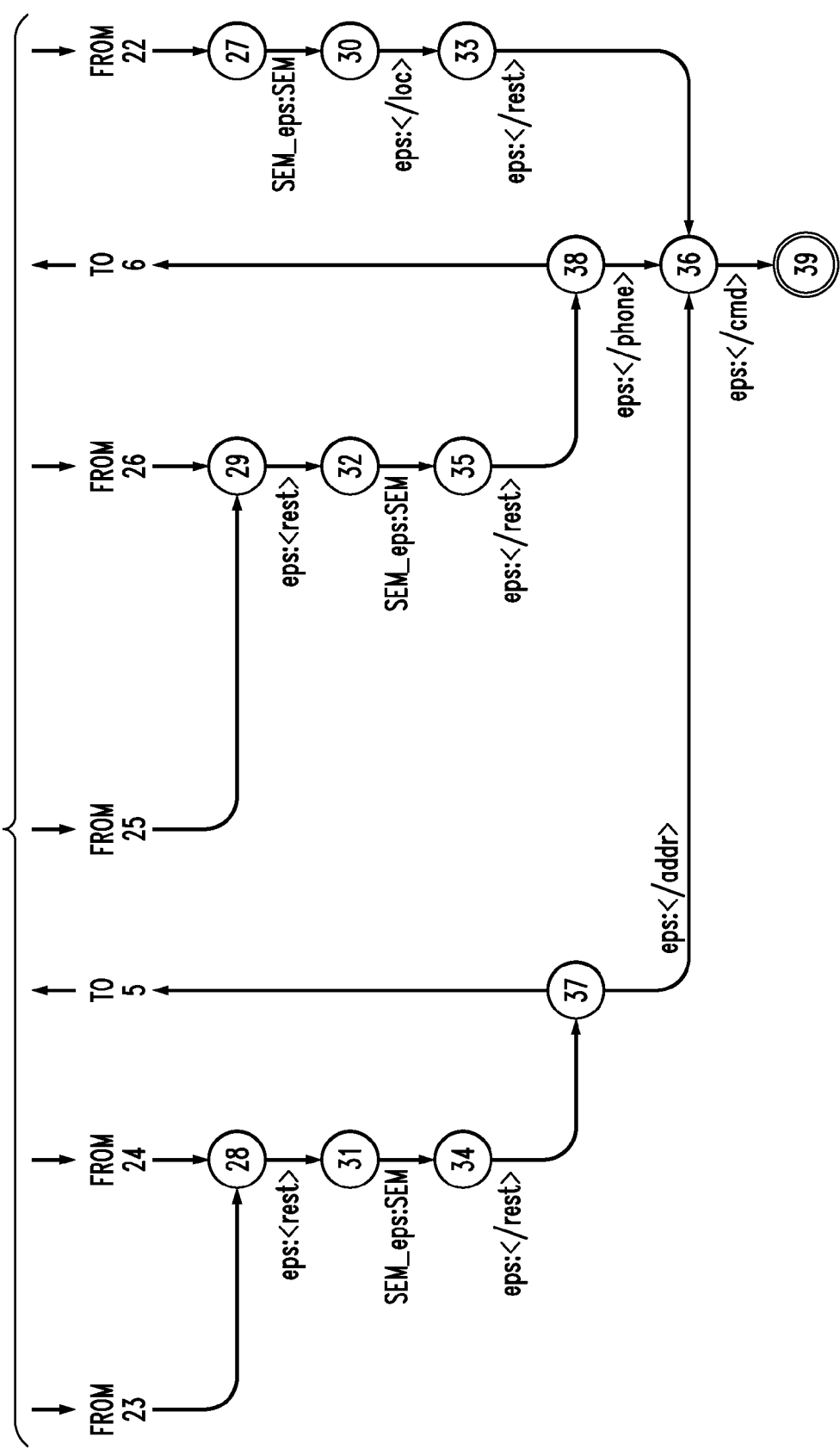

The speech/gesture/meaning finite-state transducer shown in FIG. 21 uses the cross-product of the gesture symbols G and the word symbols W as an input component or first tape. Thus, the gesture-to-speech finite-state transducer shown in FIG. 20 implements the function $\Re$: G→W. The output or second tape of the speech/gesture/meaning finite-state transducer shown in FIG. 21 contains the meaning symbols M that capture the semantic representation of the multimodal utterance, as shown in FIG. 18 and outlined above. Thus, the speech/gesture/meaning finite-state transducer shown in FIG. 21 implements the function $\Im$: (G×W)→M. That is, the speech/gesture/meaning finite-state transducer shown in FIG. 21 is a finite-state transducer in which gesture symbols and words are on the input tape and the meaning is on the output tape.

Thus, the gesture-to-speech finite-state transducer and the speech/gesture/meaning finite-state transducers shown in FIGS. 20 and 21 are used with the speech recognition system 100 and the multimodal parser/meaning recognition system 300 to recognize, parse, and/or extract the meaning from the multimodal inputs received from the gesture and speech input portions 410 and 420 of the multimodal user input device 400.

It should be appreciated that there are any variety of ways in which the multimodal finite-state transducers can be integrated with the automatic speech recognition system 100, the gesture recognition system 200 and the multimodal parser/meaning recognition system 300. Clearly, for any particular recognition task, the more appropriate approach will depend on the properties of the particular multimodal user input interface 400 through which the multimodal inputs are generated and/or received.

The approach outlined in the following description of FIGS. 18-32 involves recognizing the gesture string first. The recognized gesture string is then used to modify the language model used by the automatic speech recognition system 100. In general, this will be appropriate when there is limited ambiguity in the recognized gesture string. For example, there will be limited ambiguity in the recognized gesture string when the majority of gestures are unambiguous deictic pointing gestures. Obviously, if more complex gestures are used, such as the multi-element gestures described in Johnston 1-3, other ways of combining the gesture and speech recognition systems may be more appropriate.

Figure 22:
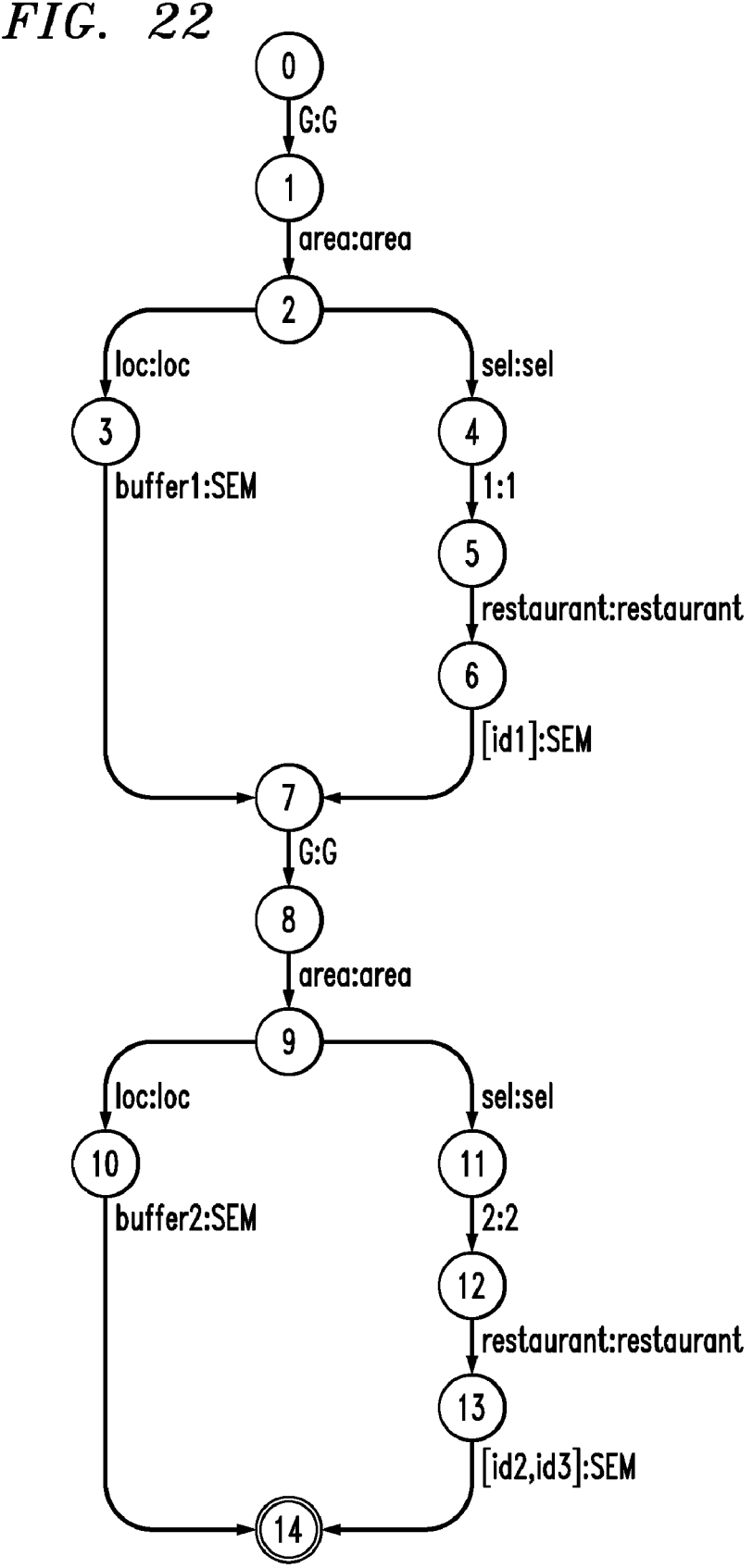
FIG. 22 is one exemplary embodiment of a gesture finite-state transducer generated by recognizing the gesture inputs shown in the exemplary embodiment of the multimodal user input device shown in FIG. 9.

Accordingly, for the specific exemplary embodiment of the multimodal user input device 400 shown in FIG. 9, the gesture recognition system 200 first processes the incoming gestures to construct a gesture finite-state transducer, such as that shown in FIG. 22, corresponding to the range of gesture interpretations. In particular, in the various exemplary embodiments of systems and methods according to this invention, to abstract over specific content of the input gesture, the input gesture is represented as a finite state transducer. This finite-state transducer relates the gesture symbols as well as the specific contents, such as, for example, entities or points on the gesture input portion selected by the user, of the input gesture to the gesture symbols, including a symbol acting as a place holder for the specific contents of the input gesture. More particularly, one side of this gesture finite-state transducer contains the specific contents of the input gesture. The other side of the gesture finite-state transducer contains a symbol, such as, for example, the "SEM" term that acts as a place holder for the specific content of the input gesture that is on the other side of the gesture finite-state transducer.

In addition, in order to perform multimodal integration using finite-state devices, the output projection of the gesture finite-state transducer, i.e., the side without the specific contents of the input gesture, is taken. For example, the output projection of the gesture finite-state transducer shown in FIG. 22 is shown as the gesture finite-state machine in FIG. 23. As discussed above, after multimodal integration, the gesture finite-state transducer is composed with a projection of the resulting gesture/speech/meaning finite-state machine in order to re-integrate the specific contents of the input gesture.

Figure 23:
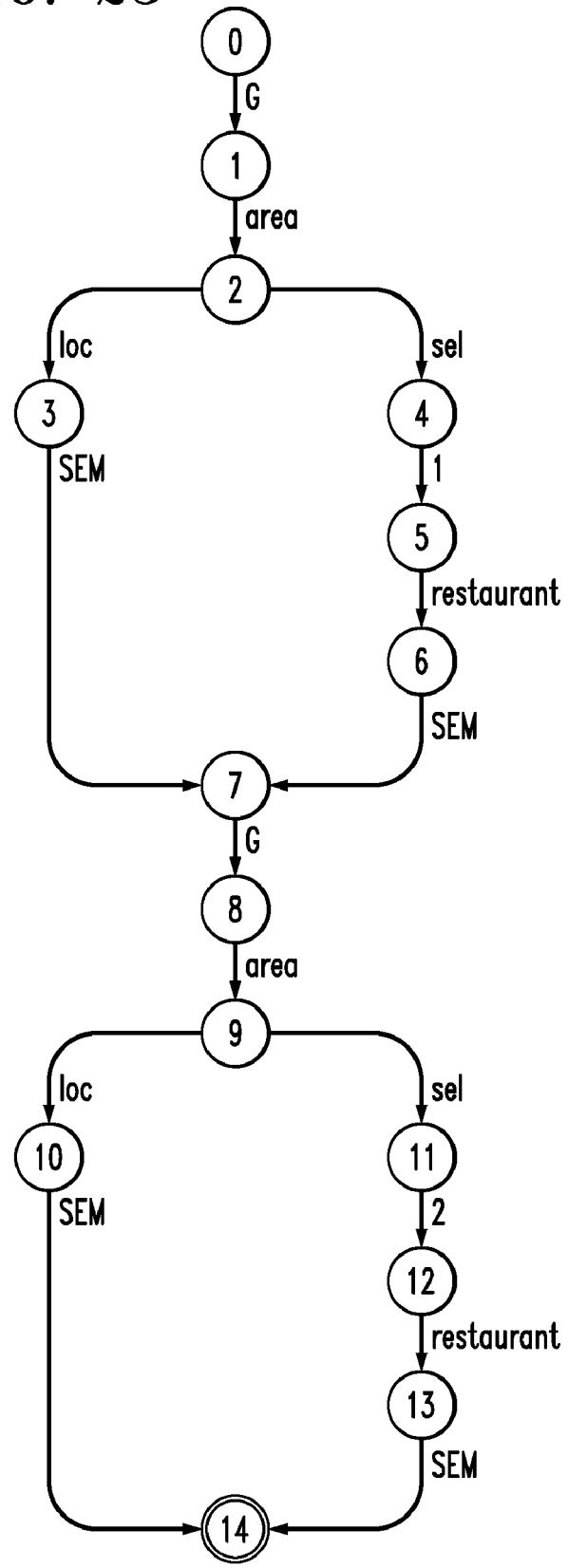
FIG. 23 is one exemplary embodiment of a gesture finite-state machine generated by recognizing the gesture inputs shown in the exemplary embodiment of the multimodal user input device shown in FIG. 9.

In addition, in the exemplary embodiments described above with respect to FIGS. 5 and 9, the gesture input is unambiguous. Thus, as shown in FIG. 23, a simple linearly-connected set of states forms the gesture finite-state machine. It should be appreciated that, if the received gestures involved more complex gesture recognition or were otherwise ambiguous, the recognized string of gestures would be represented as a lattice indicating all of the possible gesture recognitions and interpretations for the received gesture stream. Moreover, a weighted finite-state transducer could be used to incorporate the likelihoods of the various paths in such a lattice.

Figure 24:
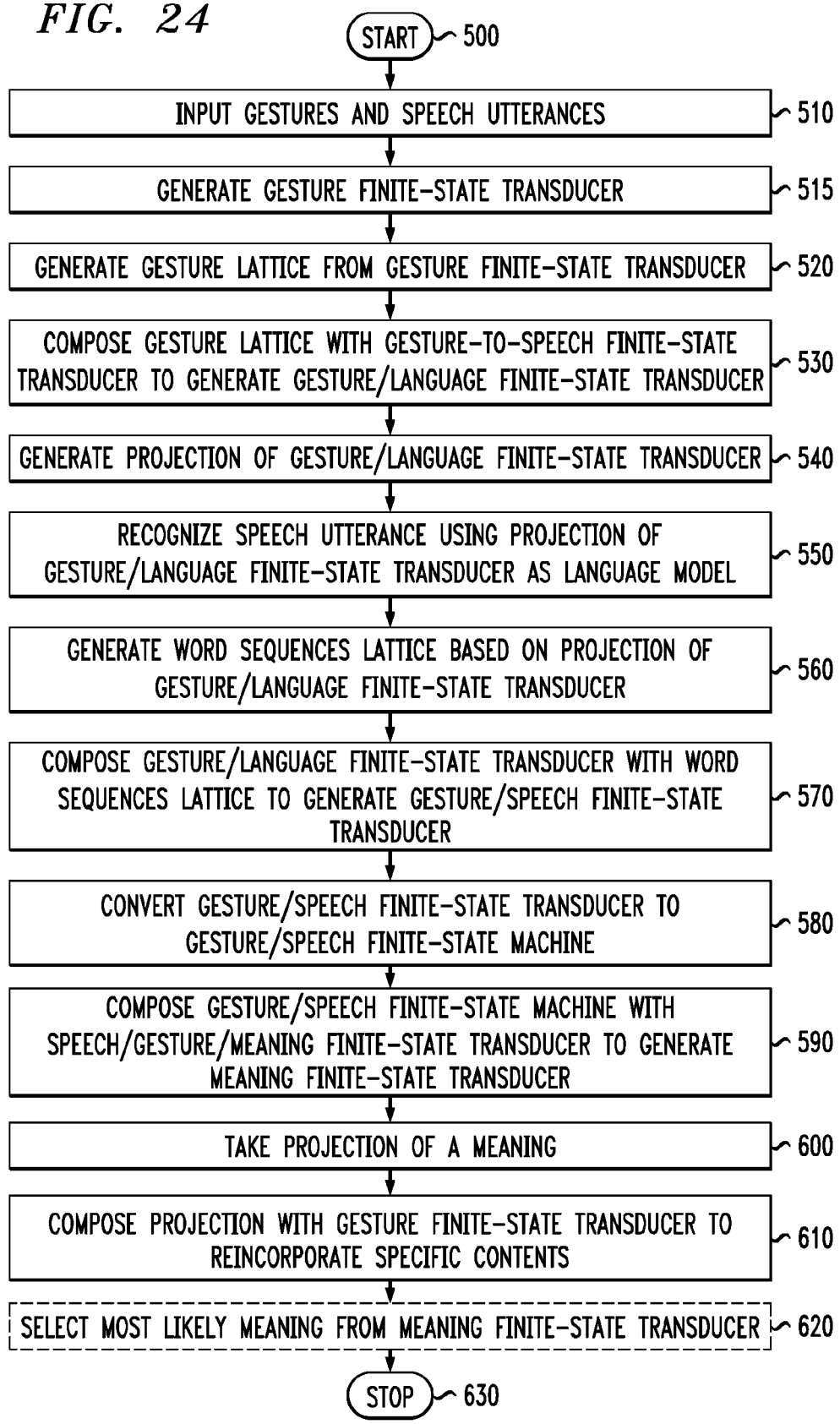
FIG. 24 is a flowchart outlining one exemplary embodiment of a method for extracting meaning from a plurality of multimodal inputs using abstraction.

FIG. 24 is a flowchart outlining one exemplary embodiment of a method for combining and converting the various multimodal input streams into a combined finite-state transducer representing the semantic meaning of the combined multimodal input streams according to this invention. Beginning in step 500, control continues to step 510, where gesture and speech utterances are input through one or more input devices that together combine to form a multimodal user input device.

Next, in step 515, a gesture finite-state transducer is generated from the input gesture utterance. The gesture finite-state transducer relates the specific contents, such as a list of entities, entity identifiers representing the entities selected by the user, or points on the gesture input portion selected by the user and/or the like of the gesture and the gesture symbols representing the input gesture to the gesture symbols representing the input gesture, including a symbol acting as a place holder for the specific contents of the input gesture. This gesture finite-state transducer essentially stores the specific contents of the input gesture, such as entities or points on the gesture input portion, selected by the user, on one side of the gesture finite-state transducer and uses a symbol, such as, for example, the "SEM" term, as a place holder for the specific contents of the input gesture on the other side of gesture finite-state transducer.

Then, in step 520, a gesture finite-state machine is generated from the gesture finite-state transducer. The gesture finite-state machine is generated by taking a projection of the output of the gesture finite-state transducer. The output of the gesture finite-state transducer contains the gesture symbols including a symbol acting as a place holder for the specific contents of the input gesture. The projection of the output of the gesture finite state transducer, i.e., the gesture finite-state machine, can be used to perform a function, such as multimodal integration, using finite-state devices.

Alternatively, in step 515, a gesture lattice that represents the input gesture can be generated from the input gesture utterance. The gesture lattice contains gesture symbols and the specific contents of the gesture, such as entities or points selected by the user. In this case, in step 520, a gesture finite-state transducer is generated from the gesture finite-state machine and the gesture finite-state transducer relates the contents of the gesture lattice to gesture symbols representing the input gesture, including a symbol acting as a place holder for the specific contents of the input gesture.

Next, in step 530, the gesture finite-state machine is composed with the gesture-to-speech transducer to generate a gesture/language finite-state transducer. For example, in the exemplary embodiment described above, the gesture finite-state machine shown in FIG. 22 is composed with the gesture-to-speech finite-state transducer shown in FIG. 20 to form the gesture/language finite-state transducer shown in FIG. 25. The gesture/language finite-state transducer represents the relationship between the recognized stream of gestures and all of the possible word sequences that could occur with those gestures of the recognized stream of gestures.

Figure 25:
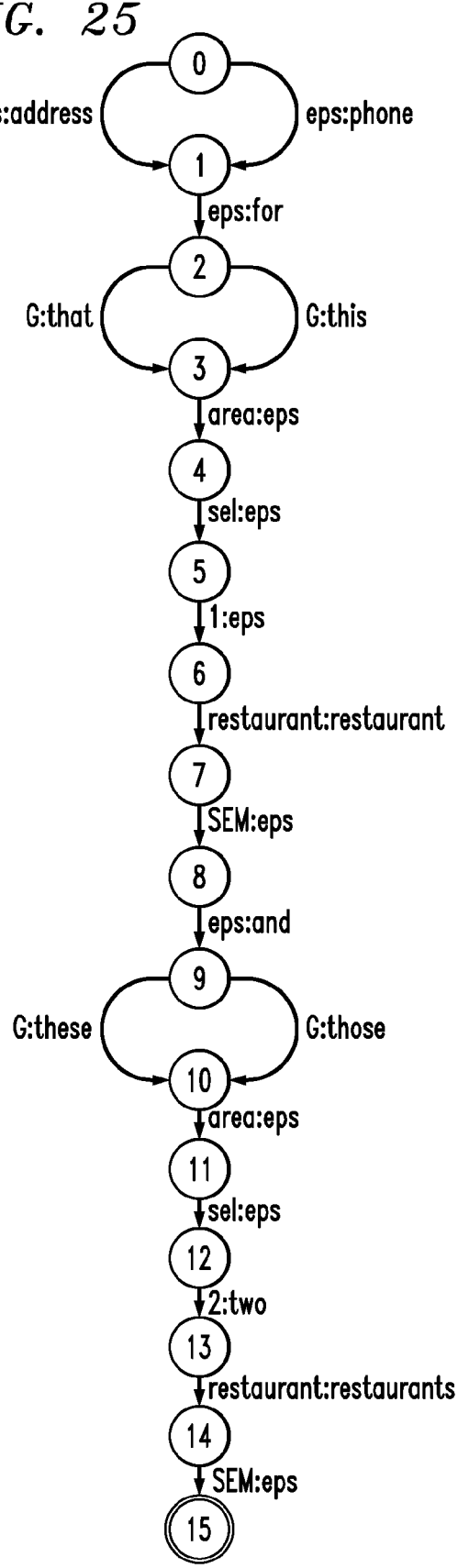
FIG. 25 is one exemplary embodiment of a gesture/language finite-state transducer illustrating the composition of the gesture finite-state machine shown in FIG. 23 with the gesture-to-speech finite-state transducer shown in FIG. 20.

Then, in step 540, in order to use this information to guide the speech recognition system 100, a projection of the gesture/language finite-state transducer is generated. In particular, a projection on the output tape or speech portion of the gesture/language finite-state transducer shown in FIG. 25 is taken to yield a finite-state machine.

Figure 26:
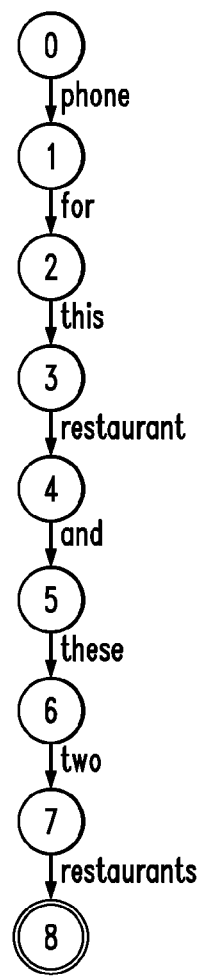
FIG. 26 is one exemplary embodiment of a speech input lattice generated by recognizing the speech input received by the exemplary embodiment of the multimodal user input device shown in FIG. 9.
Figure 27:
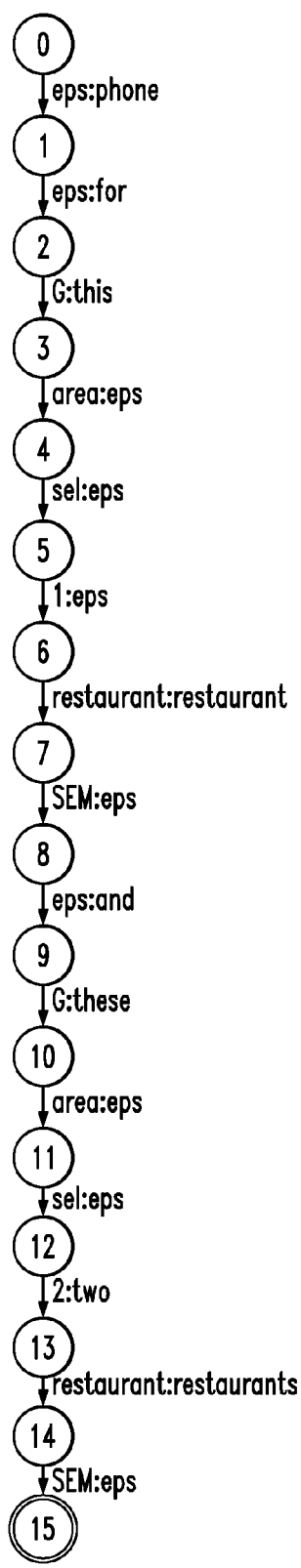
FIG. 27 illustrates one exemplary embodiment of a gesture/speech finite-state transducer generated by composing the gesture/language finite-state transducer shown in FIG. 25 with the speech input lattice shown in FIG. 26.
Figure 28:
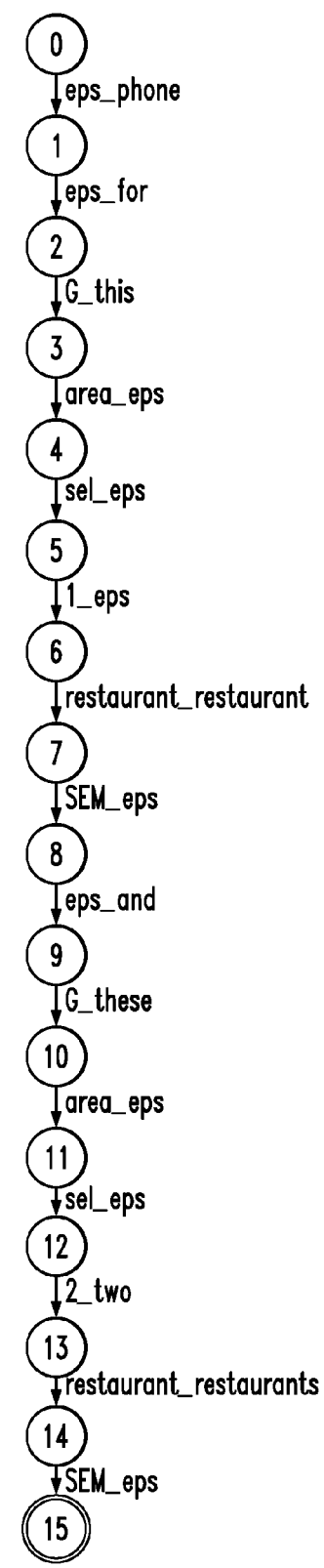
FIG. 28 is one exemplary embodiment of a gesture/speech finite-state machine obtained from the gesture/speech finite-state transducer shown in FIG. 27.

Next, in step 550, the speech utterance is recognized using the projection of the gesture/language finite-state transducer as the language model. Using the projection of the gesture/language finite-state transducer as the language model enables the gestural information to directly influence the recognition process performed by the automatic speech recognition system 100. In particular, as shown in step 560, the automatic speech recognition system generates a word sequence lattice based on the projection of the gesture/language finite-state transducer in view of the word lattice 155. In the exemplary embodiment outlined above, using the projection of the gesture/language finite-state transducer shown in FIG. 25 as the language model for the speech recognition process results in the recognized word sequence lattice "phone for this restaurant and these two restaurants", as shown in FIG. 26.

Then, in step 570, the gesture/language finite-state transducer is composed with the recognized word sequences lattice to generate a gesture/speech finite-state transducer. This reintegrates the gesture information that was removed when the projection of the gesture/language finite-state transducer was generated in step 540. The generated gesture/speech finite-state transducer contains the information both from the speech utterance and the gesture utterance received from the various portions of the multimodal user input device 400. For the example outlined above, composing the gesture/language finite-state transducer shown in FIG. 25 with the word sequences lattice shown in FIG. 26 generates the gesture/speech finite-state transducer shown in FIG. 27. Operation then continues to step 580.

Then, in step 580, the gesture/speech finite-state transducer is converted to a gesture/speech finite-state machine. In particular, the gesture/speech finite-state machine combines the input and output tapes of the gesture/speech finite-state transducer onto a single tape. In the exemplary embodiment outlined above, converting the gesture/speech finite-state transducer shown in FIG. 27 results in the gesture/speech finite-state machine shown in FIG. 28.

Figure 29:
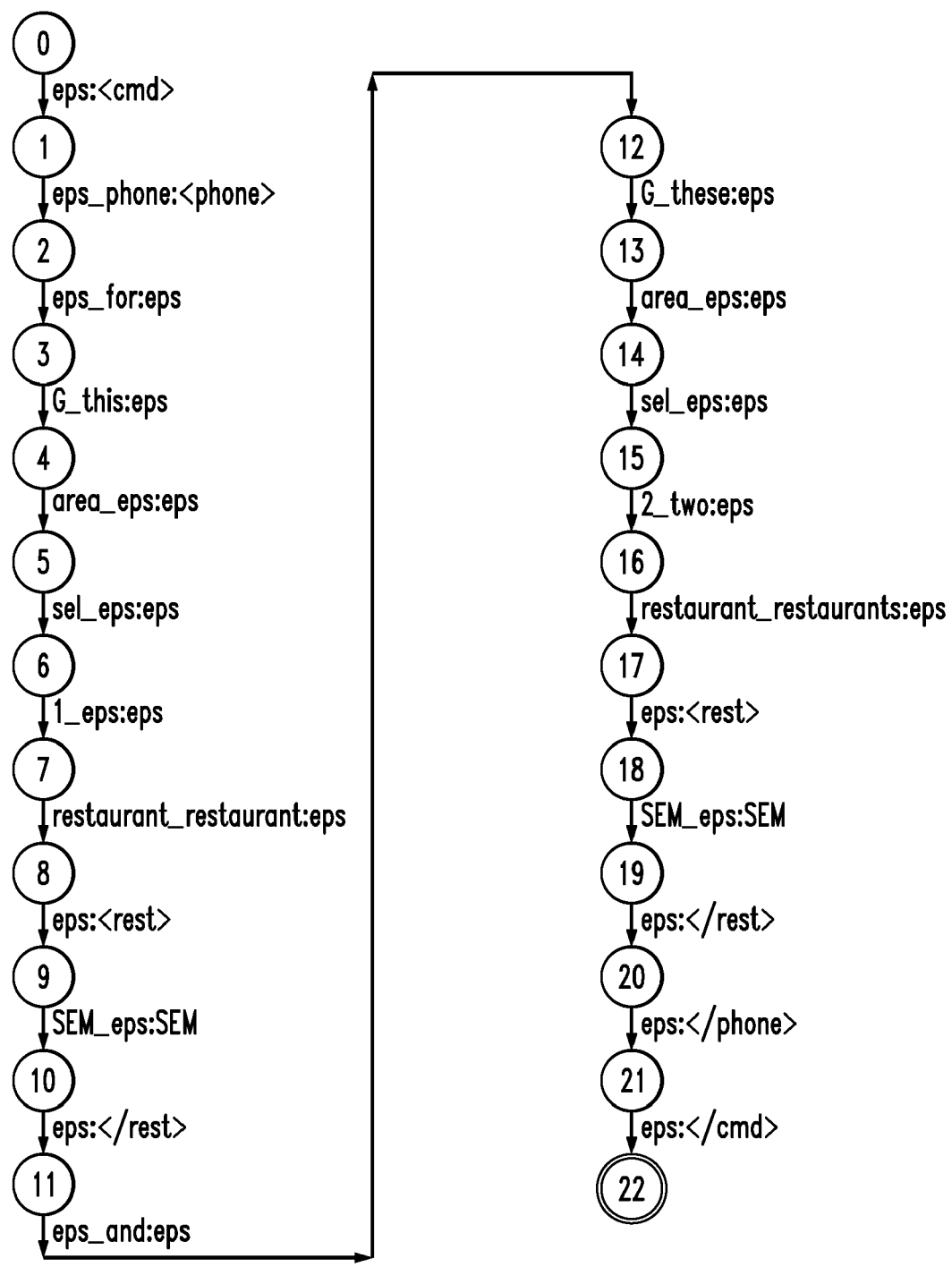
FIG. 29 is one exemplary embodiment of a finite-state transducer, obtained from composing the gesture/speech finite-state machine shown in FIG. 27 with the speech/gesture/meaning finite-state transducer shown in FIG. 21, which extracts the meaning from the multimodal gestural and spoken inputs received when using the exemplary embodiment of the multimodal user input device shown in FIG. 9.

Next, in step 590, the gesture/speech finite-state machine is composed with the speech/gesture/meaning finite-state transducer shown in FIG. 21 to generate the meaning finite-state transducer shown in FIG. 29. Because the speech/gesture/meaning finite-state transducer relates the speech and gesture symbols to meaning, composing the gesture/speech finite-state machine results in the meaning finite-state transducer which captures the combined semantic meaning or representation contained in the independent modes input using the multimodal user input device. Thus, the meaning of the multimodal input received from the multimodal user input device can be read from the output tape of the meaning finite-state transducer. In the exemplary embodiment outlined above, composing the gesture/speech finite-state machine shown in FIG. 28 with the speech/gesture/meaning finite-state transducer shown in FIG. 21 results in the meaning finite-state transducer shown in FIG. 29. In particular, it should be appreciated that the meaning finite-state transducer shown in FIG. 29 is a linear finite-state transducer that unambiguously yields the meaning. Operation then continues to step 600.

Figure 30:
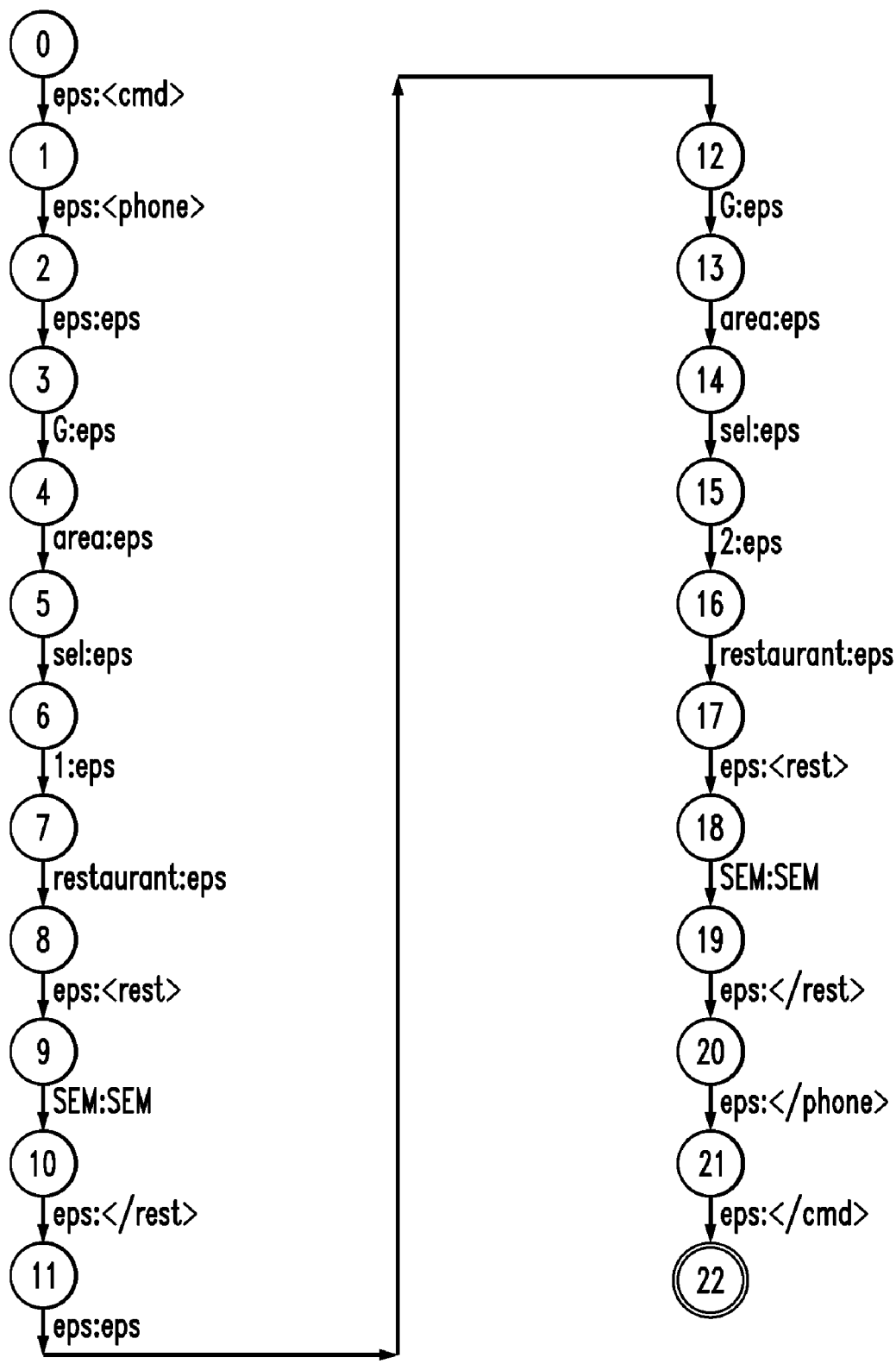
FIG. 30 is one exemplary embodiment of a finite-state machine generated by taking a projection of the finite-state transducer shown in FIG. 29.
Figures 31, 32:
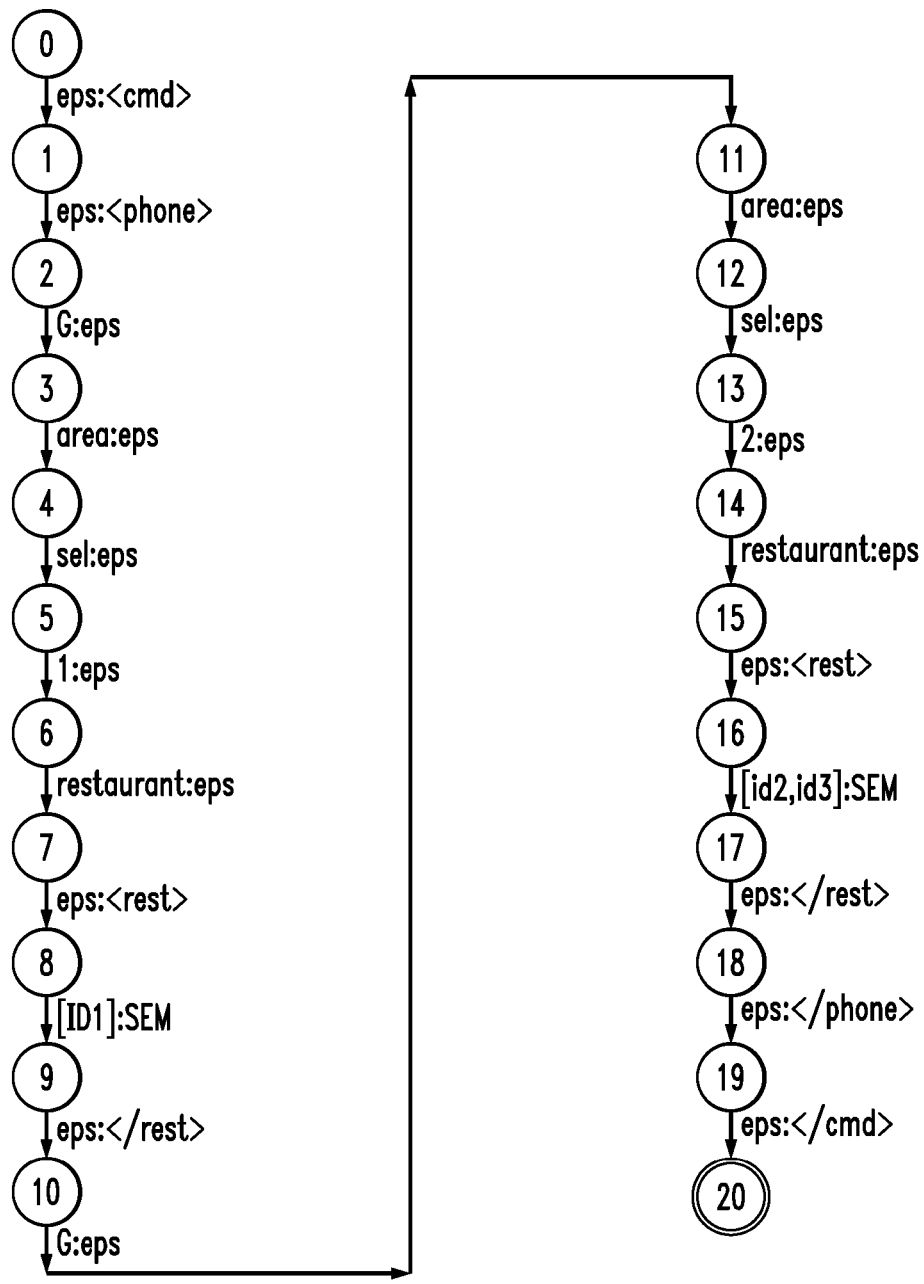
FIG. 31 is one exemplary embodiment of a finite-state machine generated by composing the finite-state machine shown in FIG. 30 with the gesture finite-state transducer shown in FIG. 22.
FIG. 32 is one exemplary illustration of a string of meaning read from the finite-state machine shown in FIG. 31.

In step 600, as shown in FIG. 30, a projection that factors out speech from the meaning finite-state transducer is taken. Then, in step 610, as shown in FIG. 31, the projection is composed with the gesture input finite-state transducer in order to reincorporate the specific contents of the input gesture. Operation then continues to step 620. As shown in FIG. 32, for example, in step 620, a meaning is obtained.

It should be appreciated that, in embodiments that use much more complex multimodal interfaces, such as those illustrated in Johnston 1-3, the meaning finite-state transducer may very well be a weighted finite-state transducer having multiple paths between the start and end nodes representing the various possible meanings for the multimodal input and the probability corresponding to each path. In this case, in step 620, the most likely meaning would be selected from the meaning finite-state transducer based on the path through the meaning finite-state transducer having the highest probability. However, it should be appreciated that step 620 is optional and can be omitted. Then, in step 630, the process ends.

As outlined above, the various exemplary embodiments described herein allow spoken language and gesture input streams to be parsed and integrated by a single weighted finite-state device. This single weighted finite-state device provides language models for speech and gesture recognition and composes the meaning content from the speech and gesture input streams into a single semantic representation. Thus, the various systems and methods according to this invention not only address multimodal language recognition, but also encode the semantics as well as the syntax into a single weighted finite-state device. Compared to the previous approaches for integrating multimodal input streams, such as those described in Johnston 1-3, which compose elements from n-best lists of recognition results, the systems and methods according to this invention provide the potential for mutual compensation among the various multimodal input modes.

The systems and methods according to this invention allow the gestural input to dynamically alter the language model used for speech recognition. Additionally, the systems and methods according to this invention reduce the computational complexity of multi-dimensional multimodal parsing. In particular, the weighted finite-state devices used in the systems and methods according to this invention provide a well-understood probabilistic framework for combining the probability distributions associated with the speech and gesture input streams and for selecting among multiple competing multimodal interpretations.

It should be appreciated that the systems and methods for representing and classifying inputs according to this invention are not limited to gestural input. The systems and methods for classifying and representing inputs according to this invention may be used for any type or mode of information. In addition, the systems and methods for representing and classifying inputs according to this invention are not limited to information that is represented with finite state methods. The representation and classification schemes according to the systems and methods of this invention may be used to classify information in any appropriate form.

In addition, the systems and methods according to this invention are not limited to systems and methods for carrying out multimodal recognition and integration. The systems and methods of representing and classifying information according to this invention may be used to classify and/or represent information as necessary to perform a desired operation or function.

It should be appreciated that the multimodal recognition and/or meaning system 1000 shown in FIG. 2, and/or each of the gesture recognition system 200, the multimodal parser/meaning recognition system 300 and/or the automatic speech recognition system 100 can each be implemented on a programmed general purpose computer. However, any or all of these systems can also be implemented on a special purpose computer, a programmed microprocessor or microcontroller and peripheral integrated circuit elements, an ASIC or other integrated circuit, a digital signal processor, a hardwired electronic or a logic circuit such as a discrete element circuit, a programmable logic device such as a PLD, a PLA, a FPGA or a PAL, or the like. In general, any device capable of implementing a finite-state machine that is in turn capable of implementing the flowchart shown in FIG. 22 and/or the various finite-state machines and transducers shown in FIGS. 19-21 and 23-28 can be used to implement one or more of the various systems shown in FIGS. 1-4.

Thus, it should be understood that each of the various systems and subsystems shown in FIGS. 1-4 can be implemented as portions of a suitably programmed general purpose computer. Alternatively, each of the systems or subsystems shown in FIGS. 1-4 can be implemented as physically distinct hardware circuits within an ASIC, or using a FPGA, a PLD, a PLA, or a PAL, or using discrete logic elements or discrete circuit elements. The particular form each of the systems and/or subsystems shown in FIGS. 1-4 will take is a design choice and will be obvious and predictable to those skilled in the art.

It should also be appreciated that, while the above-outlined description of the various systems and methods according to this invention and the figures focus on speech and gesture as the multimodal inputs, any known or later-developed set of two or more input streams representing different modes of information or communication, such as speech, electronic-ink-based gestures or other haptic modes, keyboard input, inputs generated by observing or sensing human body motions, including hand motions, gaze motions, facial expressions, or other human body motions, or any other known or later-developed method for communicating information, can be combined and used as one of the input streams in the multimodal utterance.

Thus, while this invention has been described in conjunction with the exemplary embodiments outlined above, it is evident that many alternatives, modifications and variations will be apparent to those skilled in the art. Accordingly, the exemplary embodiments of these systems and methods according to this invention, as set forth above, are intended to be illustrative, not limiting. Various changes may be made without departing from the spirit and scope of this invention.

What is claimed is:

1. A method for representing gestures made by a user, comprising:

recognizing a gesture;

converting the recognized gesture into at least one recognition result by using finite-state transducers, each recognition result comprising a sequence of symbols including a set of gesture symbols with a SEM (semantics) placeholder symbol for specific content of the gesture, wherein each symbol of the sequence of symbols identifies a specific attribute of the recognized gesture and the SEM placeholder symbol represents the specific content of the gesture such that when recomposing specific gestural content, the specific content is mapped to the SEM placeholder symbol and other specific attributes are mapped to themselves; and outputting the recognition result.

2. The method of claim 1, further comprising generating the gesture using at least one of a pen input subsystem, a computer vision input subsystem, a haptic subsystem, a gaze input subsystem, and a body motion input subsystem.

3. The method of claim 1, wherein the attribute identified by the symbol is at least one of FORM, MEANING and specific content of the recognized gesture, the specific content being represented by the SEM placeholder symbol in the sequence of symbols.

4. The method of claim 3, wherein the FORM attribute identifies the physical form of the recognized gesture.

5. The method of claim 3, wherein the MEANING attribute identifies the meaning of the FORM attribute.

6. The method of claim 5, wherein the FORM attribute has a value of at least one of area, line and arrow.

7. The method of claim 6, wherein the FORM attribute has a value of area and the MEANING attribute identifies a meaning of area.

8. The method of claim 3, wherein the MEANING attribute has a value of at least one of location and selection.

9. The method of claim 8, wherein, when the MEANING attribute has a value of selection, the recognition result uses a symbol for at least one of a number of entities selected by the gesture and a type of the entities selected by the gesture.

10. The method of claim 9, wherein the TYPE attribute identifies a type of entity or entities selected.

11. The method of claim 10, wherein the TYPE attribute has a value of at least one of at least restaurant, theatre, hotel and mixed.

12. The method of claim 3, wherein when the attribute identified by the symbol is specific content, the recognition result comprises at least one of entity identifiers and points selected by a user.

13. A system for recognizing strokes made on an input device, comprising:
  a recognition device usable to recognize gestures; and
  a converting device that converts the recognized gesture into at least one recognition result by using finite-state transducers, each recognition result comprising a sequence of symbols including a set of gesture symbols with a SEM (semantics) placeholder symbol for specific content of the gesture, wherein each symbol of the sequence of symbols identifies a specific attribute of the recognized gesture and the SEM placeholder symbol represents the specific content of the gesture such that when recomposing specific gestural content, the specific content is mapped to the SEM placeholder symbol and other specific attributes are mapped to themselves; and
  an output device that outputs the recognition result.

14. The system of claim 13, wherein the gesture is made using at least one of a pen input subsystem, a computer vision input subsystem, a haptic input subsystem, a gaze input subsystem and a body motion input subsystem.

15. The system of claim 13, wherein the attribute identified by the symbol is at least one of FORM, MEANING and specific content of the recognized gesture.

16. The system of claim 15, wherein the FORM attribute identifies the physical form of the recognized gesture.

17. The system of claim 16, wherein the FORM attribute has a value of at least one of area, line and arrow.

18. The system of claim 17, wherein the FORM attribute has a value of area and the MEANING attribute identifies the meaning of area.

19. The system of claim 15, wherein the MEANING attribute identifies the meaning of the FORM attribute.

20. The system of claim 15, wherein the MEANING attribute has a value of at least one of location and selection.

21. The system of claim 20, wherein when the MEANING attribute has a value of selection, the recognition result further comprises a symbol for at least one of a number of entities selected by the gesture and a type based on at least one of the entities selected by the gesture.

22. The system of claim 21, wherein the TYPE attribute identifies the type of entity or entities selected.

23. The system of claim 21, wherein the TYPE attribute has a value of at least one of restaurant, theatre, hotel and mixed.

24. The method of claim 13, wherein, when the attribute identified by the symbol is specific content, the recognition result comprises at least one of entity identifiers and points selected by a user.

25. A method for free-form gesture representation, comprising:
  recognizing a gesture;
  converting the recognized gesture into at least one recognition result by using finite-state transducers, each recognition result comprising a sequence of symbols including a set of gesture symbols with a SEM (semantics) placeholder symbol for specific content of the gesture, wherein each symbol of the sequence of symbols identifies a specific attribute of the recognized gesture and the SEM placeholder symbol represents the specific content of the gesture such that when recomposing specific gestural content, the specific content is mapped to the SEM placeholder symbol and other specific attributes are mapped to themselves;
  generating a recognition lattice based on the recognition result; and
  outputting the recognition lattice.

26. The method of claim 25, further comprising generating the gesture using at least one of a pen input subsystem, a computer vision input subsystem, a haptic input subsystem, a gaze input subsystem, and a body motion input subsystem.

27. The method of claim 25, wherein converting the recognized gesture into at least one recognition result having a sequence of symbols comprises using the symbols to identify at least one attribute identified by the symbol including at least one of FORM, MEANING and specific content of the recognized gesture.

28. The method of claim 27, wherein converting the recognized gesture into at least one recognition result having a sequence of symbols comprises using a FORM attribute to identify the physical form of the recognized gesture.

29. The method of claim 28, wherein converting the recognized gesture into at least one recognition result having a sequence of symbols comprises using a MEANING attribute to identify the meaning of the FORM attribute.

30. The method of claim 29, wherein converting the recognized gesture into at least one recognition result having a sequence of symbols comprises using the FORM attribute having at least a value of at least one of area, line and arrow.

31. The method of claim 25, wherein converting the recognized gesture into at least one recognition result having a sequence of symbols comprises using the symbols to identify at least one attribute identified by the symbol including at least one of FORM, MEANING and specific content of the recognized gesture, wherein a FORM attribute has a value of area and a MEANING attribute identifies the meaning of area.

32. The method of claim 25, wherein converting the recognized gesture into at least one recognition result having a sequence of symbols comprises using the symbols to identify at least one attribute identified by the symbol including at least one of FORM, MEANING and specific content of the recognized gesture, wherein a meaning attribute has a value of at least one of location and selection.

33. The method of claim 25, comprising converting the recognized gesture into at least one recognition result having a sequence of symbols comprises using the symbols to identify at least one attribute identified by the symbol including at least one of FORM, MEANING and specific content of the recognized gesture, wherein, when a MEANING attribute has a value of selection, the recognition result further comprises a symbol for at least one of a number of entities selected by the gesture and a type based on at least one of the entities selected by the gesture.

34. The method of claim 33, wherein converting the recognized gesture into at least one recognition result having a sequence of symbols comprises using a TYPE attribute to identify the type of each of at least one entity selected.

35. The method of claim 34, wherein converting the recognized gesture into at least one recognition result having a sequence of symbols comprises using the TYPE attribute to identify the type of each of at least one entity selected, wherein the TYPE attribute has a value of at least one of at least restaurant, theatre, hotel and mixed.

36. The method of claim 25, wherein converting the recognized gesture into at least one recognition result having a sequence of symbols comprises using the symbols to identify specific content including at least one of entity identifiers and points selected by a user.

* * * * *